US006904544B2

(12) United States Patent
DeRolf et al.

(10) Patent No.: US 6,904,544 B2
(45) Date of Patent: Jun. 7, 2005

(54) METHOD, SYSTEM, PROGRAM, AND DATA STRUCTURES FOR TESTING A NETWORK SYSTEM INCLUDING INPUT/OUTPUT DEVICES

(75) Inventors: William B. DeRolf, Layfayette, CO (US); Gavin J. Kirton, Erie, CO (US)

(73) Assignee: Sun Microsystems, Inc., Santa Clara, CA (US)

( * ) Notice: Subject to any disclaimer, the term of this patent is extended or adjusted under 35 U.S.C. 154(b) by 691 days.

(21) Appl. No.: 09/772,626

(22) Filed: Jan. 30, 2001

(65) Prior Publication Data

US 2002/0104039 A1 Aug. 1, 2002

(51) Int. Cl.[7] .............................................. G06F 11/00
(52) U.S. Cl. ...................................................... 714/43
(58) Field of Search .............................. 714/43, 46, 57, 714/42, 44

(56) References Cited

U.S. PATENT DOCUMENTS

| | | | | |
|---|---|---|---|---|
| 5,127,012 A | * | 6/1992 | Hiliger | 714/46 |
| 5,544,308 A | * | 8/1996 | Giordano et al. | 714/26 |
| 5,663,950 A | * | 9/1997 | Lee et al. | 370/224 |
| 2002/0050926 A1 | * | 5/2002 | Lewis et al. | 340/506 |

FOREIGN PATENT DOCUMENTS

| | | |
|---|---|---|
| EP | 0403414 | 12/1990 |
| WO | 0052576 | 9/2000 |

OTHER PUBLICATIONS

Fibre Channel Consortium of InterOperability Laboratory. "Fibre Channel FC–AL–2 *Parametric Test Suite For ANSI X3.272–199X*" Revision 7.0, Jan. 1, 2000, pp. 1–296.
PCT International Search Report in App. No. PCT/US 02/02449; Search mailed on Nov. 7, 2002.

* cited by examiner

*Primary Examiner*—Scott Baderman
(74) *Attorney, Agent, or Firm*—Meyertons Hood Kivlin Kowert & Goetzel, P.C.; B. Noël Kivlin

(57) ABSTRACT

Provided is a method, system, program, and data structures for maintaining a database of objects. At least one structured document is received representing an instance of an object including attributes and attribute values defined for a class. Content of the structured document representing the object is added into a database, wherein the database is capable of storing multiple structured documents representing multiple objects. In another implementation, an instance of at least one object including attributes and attribute values defined for a class is generated. For each generated object, a structured document is generated representing the object and including a representation of the attributes and attribute values in the object. Each structured document is transferred to a database program to maintain.

68 Claims, 13 Drawing Sheets

METHOD, SYSTEM, PROGRAM, AND DATA STRUCTURES FOR TESTING A NETWORK SYSTEM INCLUDING INPUT/OUTPUT DEVICES

BACKGROUND OF THE INVENTION

1. Field of the Invention

The present invention relates to a method, system, program, and data structures for testing a network system including input/output (I/O) devices.

2. Description of the Related Art

A storage area network (SAN) comprises a network linking one or more servers to one or more storage systems. Each storage system could comprise a Redundant Array of Independent Disks (RAID) array, tape backup, tape library, CD-ROM library, or JBOD (Just a Bunch of Disks) components. Storage area networks (SAN) typically use the Fibre Channel Arbitrated Loop (FC-AL) protocol, which uses optical fibers to connect devices and provide high bandwidth communication between the devices. In Fibre Channel terms the switch connecting the devices is called a "fabric". The link is the two unidirectional fibers, which may comprise an optical wire, transmitting to opposite directions with their associated transmitter and receiver. Each fibre is attached to a transmitter of a port at one end and a receiver of another port at the other end. When a fabric is present in the configuration, the fibre may attach to a node port (N_Port) and to a port of the Fabric (F_Port).

Because a Fibre Channel storage area network (SAN) is an amalgamation of numerous hosts, workstations, and storage devices, troubleshooting for errors can often be a somewhat complex process. Currently, in the prior art, a technician will perform a series of tests from a host system in the SAN and test various channels and connections to the storage devices to detect problems and then try to locate the specific source of a problem. Technicians generally rely on their own knowledge, experience and expertise when diagnosing the SAN system for errors. Such knowledge is not a shared resource, but rather an individual point of view and an accumulation of guess work and personal experience. As a result, it is unlikely that different storage experts troubleshoot a storage system in the same manner, thereby leading to possible incorrect or inconsistent diagnosis as well as an increase in the Mean Time To Diagnose (MTTD). Moreover, as the number of SAN systems proliferate, it may become more and more difficult for system administrators to locate available diagnosticians.

Certain "cookbook" approaches to testing a Fibre Channel network have been proposed, such as the "Fibre Channel FC-AL-2 Parametric Test Suite Rev. 7.0", published by the Fibre Channel Consortium, document no. ANSI X3.272-199X (January 2000), which publication is incorporated herein by reference in its entirety. Such documents describe specific tests that may be performed to troubleshoot a Fibre Channel network. However, again the order in which the tests are selected and performed is still a matter of choice for the diagnostician performing the troubleshooting operations.

Notwithstanding current efforts at troubleshooting network components, such as a SAN, the current art lacks tools that provide an integrated and consistent approach toward diagnostic testing of a SAN and its components.

SUMMARY OF THE DESCRIBED IMPLEMENTATIONS

Provided is a computer implemented method, system, and program for a diagnostic tool to automatically diagnose a system. A determination is made of a path in the storage system to test. The path includes path components including at least a host adaptor, a link, a device interface, and a device. A first test is performed to determine if there is a failure in the path. At least one of the path components is added to a suspect list capable of being a cause of the failure. The suspect list is implemented in a computer readable data structure. At least one isolation test is performed on at least one of the path components added to the suspect list. The tested path component is removed from the suspect list if the isolation test confirms that the tested path component cannot be a source of the failure. The suspect list is returned to a user to provide information on the path components capable of being the cause of the failure.

Further implementations concern a computer readable medium including data structures used to perform diagnostic testing of a system. A rule object includes code defining a flow of operations to perform diagnostic testing of a path in the system. The path includes path components including at least a host adaptor, a link, a device interface, and a device. The rule object calls test descriptors associated with a testing operation to perform. A test descriptor object includes test descriptors. Each test descriptor specifies one or more program modules to perform the testing operation associated with the test descriptor. A module object includes program modules providing code to perform testing operations. A call to one test descriptor executes the program modules specified by the test descriptor to perform diagnostic testing operations according to the operation flow specified in the rule object.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof and which illustrate several embodiments of the present invention. It is understood that other embodiments may be utilized and structural and operational changes may be made without departing from the scope of the present invention.

Figure 1:
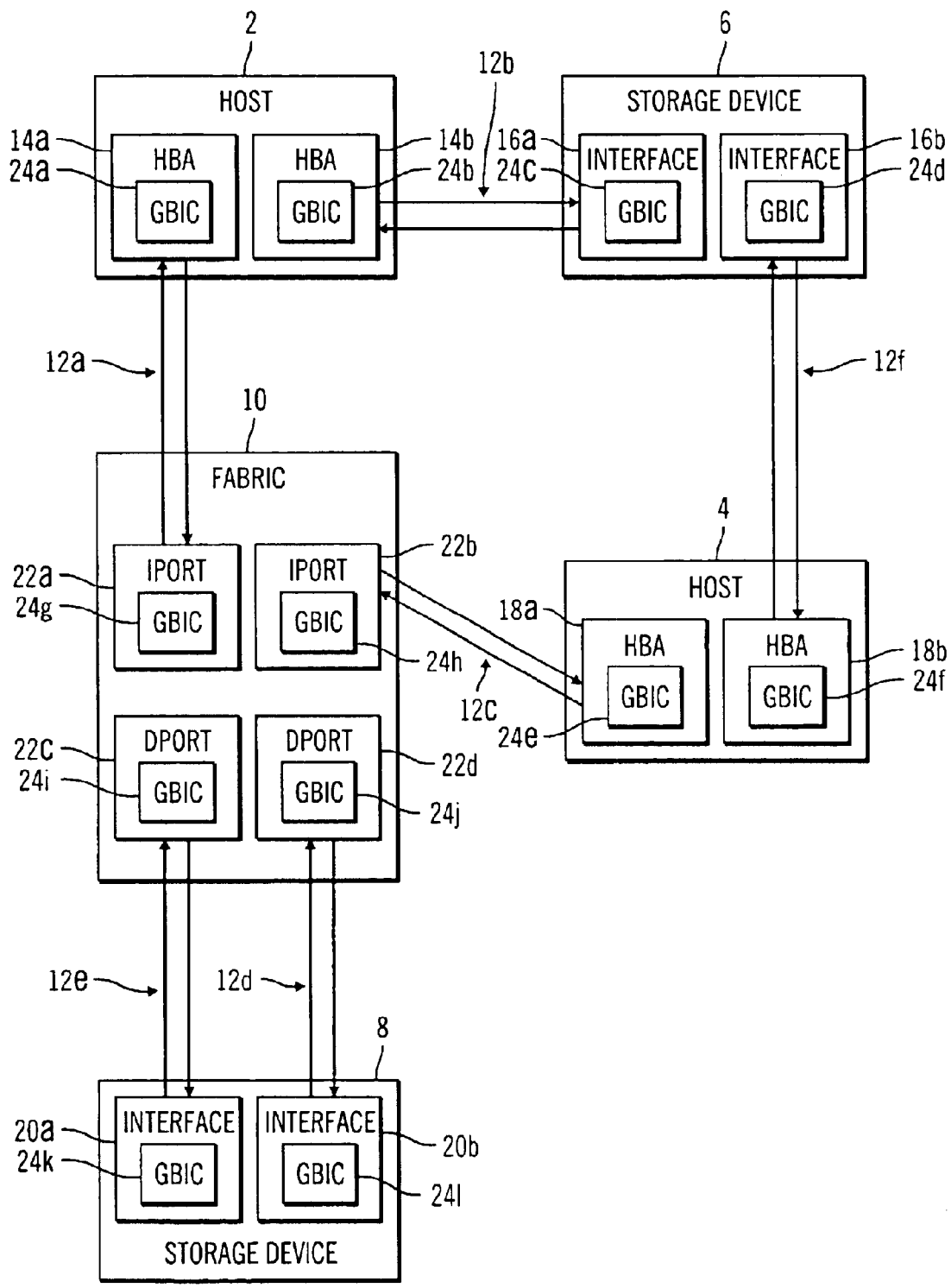
FIG. 1 illustrates a network computing environment in which preferred embodiments may be implemented.

FIG. 1 illustrates an example of a storage area network (SAN) topology utilizing Fibre Channel protocols which may be tested using the expert diagnostic tool of the described implementations. Host computers 2 and 4 may comprise any computer system that is capable of submitting an Input/Output (I/O) request, such as a workstation, desktop computer, server, mainframe, laptop computer, handheld computer, telephony device, etc. The host computers 2 and 4 would submit I/O requests to storage devices 6 and 8. The storage devices 6 and 8 may comprise any storage device known in the art, such as a JBOD (just a bunch of disks), a RAID array, tape library, storage subsystem, etc. Fabric 10 comprises a switch connecting the attached devices 2, 4, and 8. In the described implementations, the links 12*a, b, c, d, e, f* connect the devices comprise Fibre Channel Arbitrated Loops or fiber wires. In alternative implementations, the different components of the system may comprise any network communication technology known in the art. Each device 2, 4, 6, and 8 includes multiple Fibre Channel interfaces 14*a*, 14*b*, 16*a*, 16*b*, 18*a*, 18*b*, 20*a*, 20*b*, 22*a*, and 22*b*, also referred to as a port, device or host bus adaptor (HBA), and a Gigabyte Interface Converter Modules (GBIC) 24*a–l*. The GBICs 24*a–l* convert optical signals to electrical signals. The fibers 12*a, b, c, d, e, f;* interfaces 14*a, b*, 16*a, b*, 18*a, b*, 20*a, b*, 22*a, b*, and GBICs 24*a–l* comprise individually replaceable components, or field replaceable units (FRUs). The components of the storage area network (SAN) described above would also include additional FRUs. For instance, the storage devices 6 and 8 may include hot-swapable disk drives, controllers, and power/cooling units, or any other replaceable components. For instance, the Sun Microsystems' Ax5000 storage array has an optical interface and includes a GBIC to convert the optical signals to electrical signals that can be processed by the storage array controller. The Sun Microsystems' T3 storage arrays includes an electrical interface and includes a media interface adaptor (MIA) to convert electrical signals to optical signals to transfer over the fiber.

A path, as that term is used herein, refers to all the components providing a connection from a host to a storage device. For instance, a path may comprise host adaptor 14*a*, fiber 12*a*, initiator port 22*a*, device port 22*c*, fiber 12*e*, device interface 20*a*, and the storage devices or disks being accessed. The path may also comprise a direct connection, such as the case with the path from host adaptor 14*b* through fiber 12*b* to interface 16*a*.

Figure 2:
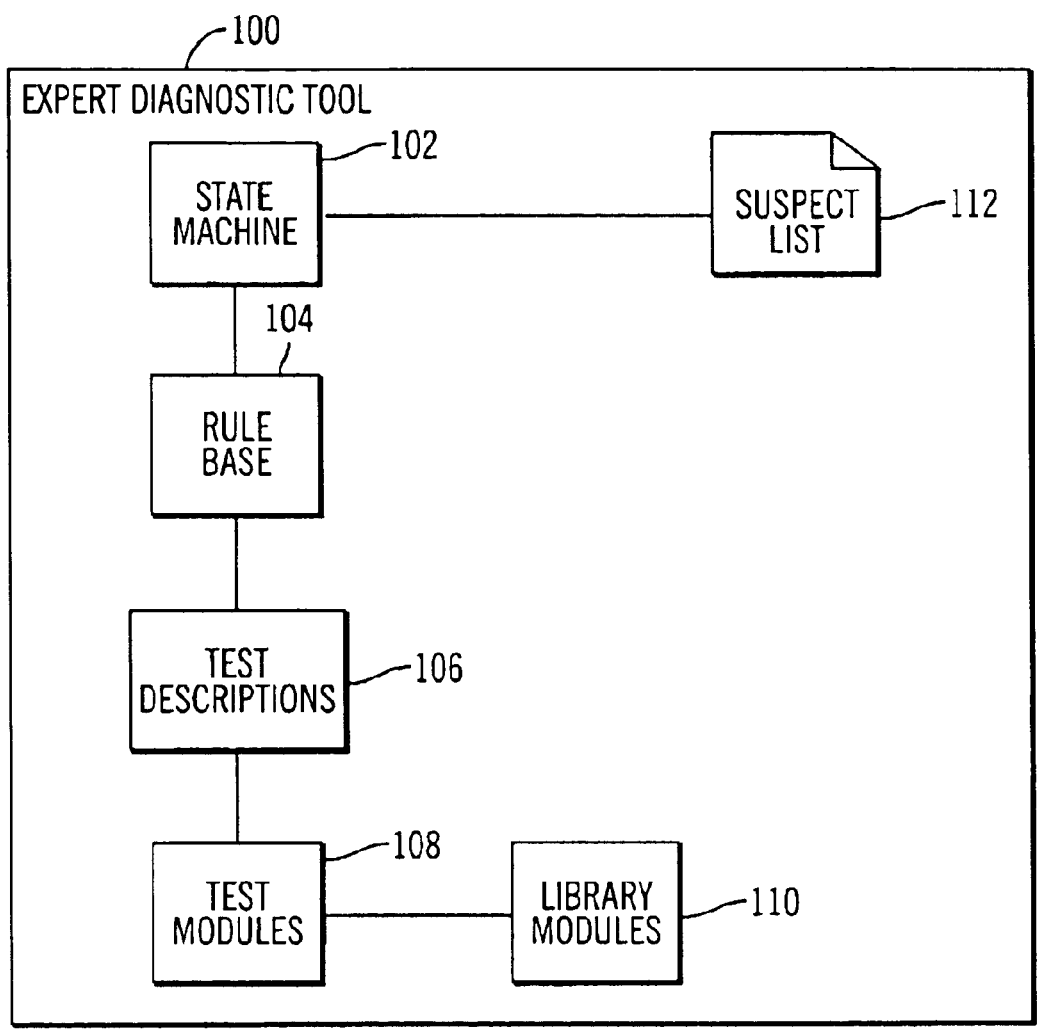
FIG. 2 illustrates an implementation of an expert diagnostic software tool in accordance with certain implementations of the invention.

FIG. 2 illustrates an implementation of the architecture of a storage diagnostic tool 100 that may be installed on host systems 2 and 4 to test the paths to the storage devices 6 and 8 through the fabric 10 or directly connected to the storage device, e.g., fiber links 12*b, f*. The expert diagnostic tool 100 includes a state machine 102 that is the program component including code to manage and execute rules from the rule base 104. The rule base 104 code defines the general flow of the diagnostic operations. The rule base code references test descriptors within the test descriptions module 106. Each test description included in the test descriptions module 106 references one or more of the routines from the test modules 108, which in turn may reference one or more library modules 110 that perform basic operations shared by different test modules. Each test module includes code implementing a particular test operation. As the state machine 102 is executing the testing modules, the state machine 102 would add field replaceable units (FRU) within the storage area network (SAN) paths being tested that could be the source of any detected errors to a suspect list 112 file. If during testing operations, the rule base 104 determines that a FRU previously placed on the suspect list 112 is replaced or otherwise determined to not be the source of the failure or error, then the FRU would be removed from the suspect list 112.

The state machine 102 would begin performing the testing routine outlined in the rule base 104 in response to user input commands invoking the expert diagnostic tool 100 entered through a host system 2, 4 interface, such as a command line or graphical user interface (GUI). The rule base 104 implements a testing routine an expert would perform including determinations an expert diagnostician would make based on the outcome of certain of the tests. FIGS. 3–13 illustrate the logic flow of the code included in the rule base 104, which calls the test descriptions 106, where each test description would specify one or more of the test modules 108 to execute to carry out the test specified by the test description.

FIGS. 3–13 illustrate logic implemented in the rule base 104 to automatically and consistently perform an expert system diagnosis of the SAN shown in FIG. 1. Following are some of the test descriptors used in the logic of FIGS. 3–13 to implement the expert diagnostic system. Each test descriptor would be comprised of one or more of the test modules 110, which themselves may be comprised of one or more library modules:

STRESS TEST: specifies various testing algorithms to determine if the path between the host bus adaptor (HBA) 14*a, b* 18*a, b* and storage device 6, 8 is working properly.

IS DISK: determines a type of the storage device 6, 8, e.g., a Sun StorEdge A5200 disk array or T3 array, etc.** The disk type may specify whether the disk is addressed directly, such as the case with a JBOD, or logically addressed through a volume manager. There may be different IS_DISK test descriptors that are checked for each disk type that may be included in the SAN.

IS SWITCHED: Determines whether a switch is located between the hosts 2, 4 and storage device 6, 8, e.g., fabric 10, or whether there is a direct connection, e.g., fiber 12*b, f*.

DPORT TEST: Specifies one or more diagnostic tests to determine whether the connection 12*d, e* between the device ports 22*c, d* and storage device 8 interface 20*a, b* is functioning properly.

REM DPORT FIBER: Instructs the administrator through a user interface to remove the fiber connection to the device port 22*c, d*, i.e., disconnect or unplug the fiber from the port.

INS DPORT LB: Instructs the administrator to install the loopback fiber on the GBIC 24*i, j* at the device port 22*c, d* to allow reading and writing through the loopback path of the port. During loopback diagnostics, data sent through the loopback path is compared with the originally sent data to determine if the data has changed during transmission through the loopback. The diagnostic tests may also perform statistical analysis of the data to detect any anomalies.

REM DPORT LB: Instructs the administrator to remove loopback fiber to allow the device port 22*c, d* to communicate over the fiber 12*d, e*.

REP DPORT FIBER: Instructs the administrator to replace the fiber 12*d, e* between the device port 22*c, d* and the storage device 8 to isolate the fiber.

REST DPORT FIBER: Instructs the administrator to reinstall the fiber that was previously replaced to isolate test the device port fiber 12*d, e*.

REP DEV: Instructs the administrator to remove current storage device FRUs, e.g., the GBIC 24, *k, l*, and replace with new device FRUs to perform isolation testing on the storage device components. For instance, the device FRUs may comprise the GBICs 24*k, l*, or if the storage device 8 is a Sun StorEdge T3 array, the FRU may comprise a media interface adaptor (MIA).

REST DEV: Instructs the administrator to reinstall the device interface FRUs, e.g., the GBIC 24, *k, l*, previously removed in response to the REP_DEV descriptor.

IS DISK AVAILABLE: Determines whether a disk is online and available. There may be different IS_DISK_AVAILABLE descriptors for each different type of device determined by the IS_DISK descriptor.

DISK ISOLATION: Provides algorithms to perform series of test to determine if disks in the storage device 6, 8 are functioning properly.

REP DPORT GBIC: Instructs the administrator to replace the device port GBIC 24i, j to isolate the fiber device port.

IPORT TEST: Specifies one or more diagnostic tests to run to determine whether the path 12a, c between one initiator port 22a, b and one host adaptor 14a, 18a is functioning properly.

IS HBA: determines a type of the host adaptor 14a, b, 18a, b, e.g., a Fibre Channel arbitrated loop adaptor, e.g., the StorEdge PCI FC-100 adaptor, the S-bus FC100 HA adaptor, etc. There may be multiple IS_HBA test descriptors that are checked for the different types of host adaptors included in the SAN.

LBF TEST: Specifies one or more diagnostic tests to perform a loopback frame test on an adaptor or interface to determine whether the data transmitted is not erroneously altered during transmission through the data path component.

REM IPORT FIBER: Instructs the administrator through a user interface to disconnect the fiber connection to the initiator port 22a, b, i.e., unplug the fiber from the port.

REP IPORT FIBER: Instructs the administrator to replace the fiber 12a, c between the host 2, 4 and the fabric 10.

REST IPORT FIBER: Instructs the administrator to reinstall the fiber that was previously replaced to isolate test the initiator port fiber 12a, c.

REM HBA FIBER: Instructs the administrator through a user interface to disconnect the fiber connection 12a, b, c, f, 18a at the host adaptor 14a, b, 18a, b, i.e., unplug the fiber from the host adaptor port.

HBA TEST: Specifies one or more diagnostic tests to run to determine whether the host adaptor 14a, b, 18a, b is functioning properly. There may be separate HBA_TESTs for different host adaptor types, determined using the IS_HBA descriptor.

INS HBA LB: Instructs the administrator to insert the loopback fiber at the host adaptor to allow for loopback testing of a GBIC 24a, b, e, f of the host adaptor. Thus, after the fiber 12a, b, c, f is removed from the host adaptor 14a, b, 18a, b the loopback fiber that provides a loopback path is inserted at the host adaptor to allow for loopback testing.

HBA GBIC TEST: Specifies one or more loopback diagnostic tests to perform to determine whether the host adaptor GBIC 24a, b, e, f is functioning properly.

REST HBA FIBER: Instructs the administrator to reinstall the fiber that was previously removed from the host adaptor.

REP HBA GBIC: Instructs the administrator to replace the host adaptor GBIC 24a, b, e, f to isolate the host adaptor GBIC.

Figure 3:
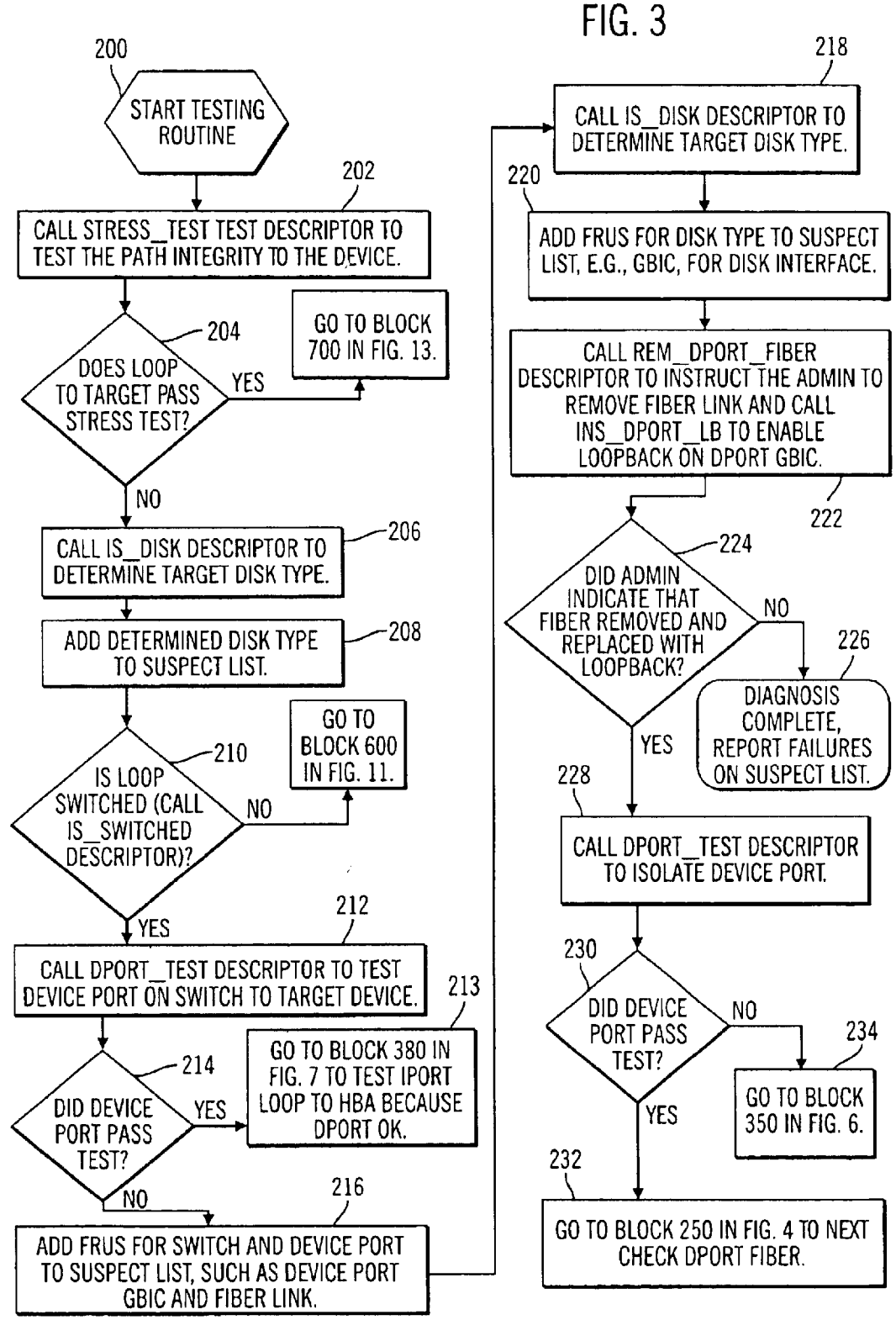
FIGS. 3–13 illustrate logic implemented in the expert diagnostic tool to perform diagnostic testing of a storage system in accordance with certain implementations of the invention.
Figure 4:
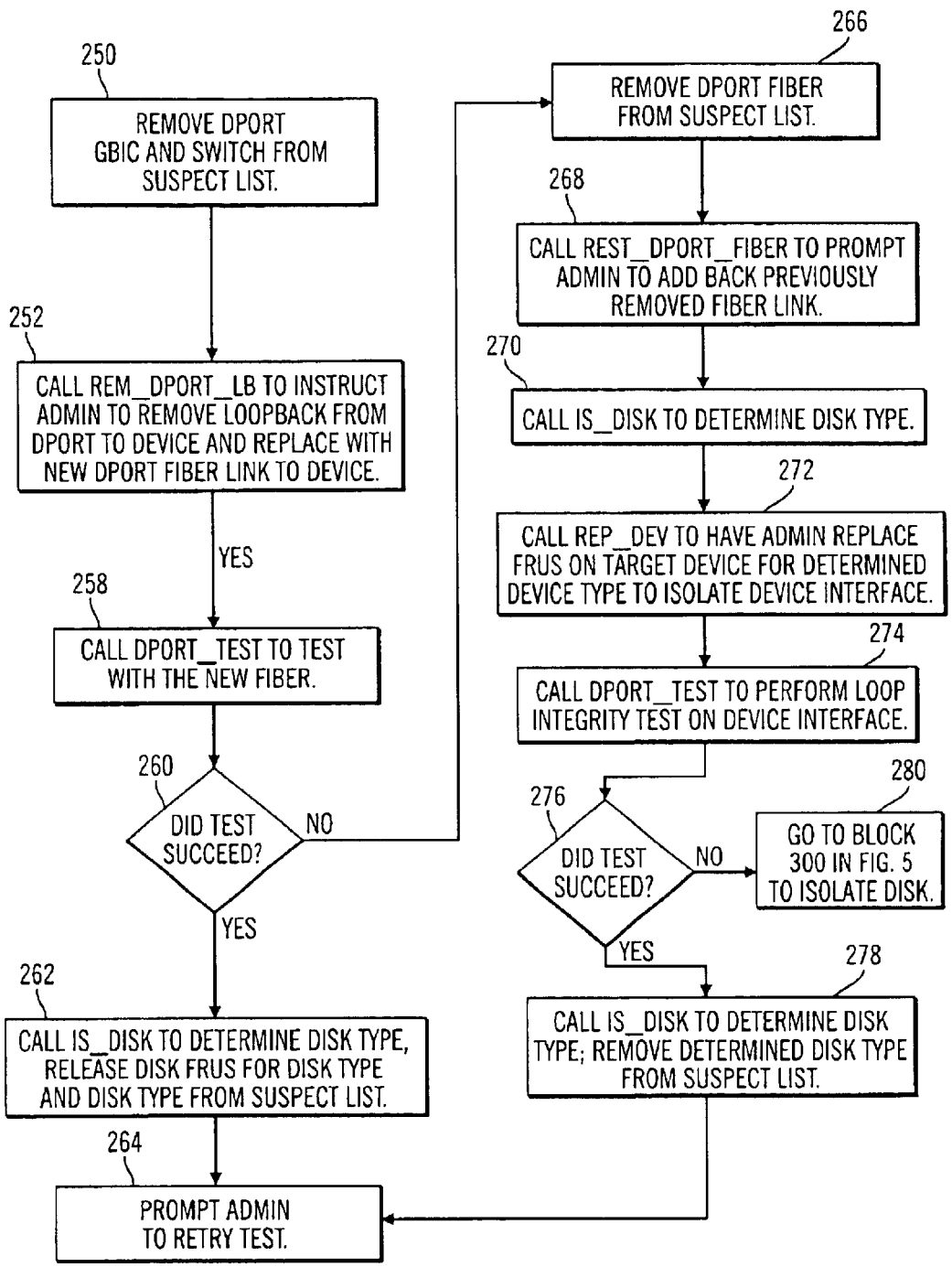

The diagnostic routine begins at block 200 in FIG. 3. The state machine 102 calls (at block 202) the STRESS_TEST test descriptor to test the integrity of the path from the host bus adaptor (HBA) 14a, 14b, 18a, 18b to an interface 16a, b, 20a, b in the storage device 6, 8. The administrator may specify a path from the host to one of the storage devices, including the host adaptors and device interfaces on the path.

If the STRESS_TEST fails, then the state machine 102 calls the IS_DISK descriptor to determine the target disk type. The determined disk type is added (at block 208) to the suspect list 112, e.g., indicating a disk or LUN as the suspect. The state machine 102 then calls the IS_SWITCHED test descriptor if (at block 210) the loop or connection between the host 2, 4 and storage device 6, 8 includes a switch, e.g., fabric 10. If there is a switch, then the DPORT_TEST test descriptor is called (at block 212) to test the loop between the device port (DPORT) 22c, 22d and the storage device interface 20a, b.

If (at block 214) the device port connection 12d, e is not operating properly according to the DPORT_TEST, then all the components on the connection between the fabric 10 and storage device 8 are added (at block 216) to the suspect list as possible sources of the failure, including any field replaceable units (FRUs) for the device port 22c, d and interface 20a, b, which may include GBICs 24i, j, k, l, the switch 10, and the fiber 12d, e. The IS_DISK descriptor is called (at block 218) to determine the target disk type on the connection being checked, so that any field replaceable units (FRUs) within the storage device 8 may be added (at block 220) to the suspect list 112, e.g., the GBIC 24k, l. The state machine 102 then calls (at block 222) the REM_DPORT_FIBER to disable the connection, i.e., disconnect, from the device port 22c, d to the fiber 12d, e and then calls INS_DPORT_LB to enable the loopback feature on the device port 22c, d. If (at block 224) the administrator (referred to as "admin" in the figures) acknowledges that the manual operations requested at block 222 were not performed, then the diagnosis ends (at block 226) and the suspect list 112 is returned with all the components added, which at block 226 includes all the suspect components between the device port 22c, d and storage device 8. If the administrator indicates through a user interface that the requested manual operation was performed, then control proceeds to block 228. Note that whenever the state machine 102 requests the administrator to perform a manual operation, the diagnostic test would end, as at block 226, if the administrator indicates that the requested manual operation was not performed. The manual operations involve the administrator replacing parts or disconnecting components to allow isolation testing of specific components. The diagnostic expert program continues if the administrator indicates that the requested manual operation was performed.

At block 228, the state machine 102 calls the DPORT_TEST descriptor to isolate the device port 22c, d now that it is not connected on the fiber 12d, e. To communicate with the fabric 10, the hosts 2, 4 and fabric 10 would include an Ethernet or other network adaptor to allow for out-of-band communication outside of the fiber connection. In this way, the hosts 2, 4 can communicate with the fabric 10 when the fiber 12a, c are unplugged. Out-of-band communication is used whenever the hosts 2, 4 need to communicate with a SAN component where the fiber link has been disconnected. If(at block 230) the device port passed, then control proceeds (at block 232) to block 250 in FIG. 4 to proceed to test components downstream of the device port 22c, d as the isolated device port was confirmed as operational. With respect to FIG. 4, at block 250, the state machine 102 removes (at block 250) the switch and the device port GBIC 24i, j from the suspect list 112. The REM_DPORT_LB descriptor is called (at block 252) to instruct the administrator to remove the loopback connection and REP_DPORT_FIBER is called to instruct the administrator to replace the fiber wire 12d, e with a new fiber to allow isolation testing of the device port fiber 12d, e. The state machine 102 calls (at block 258) the DPORT_TEST descriptor to test whether replacing the fiber corrected the problem. If (at block 260) the test succeeded, then the state machine 102 calls (at block 262) the IS_DISK test descriptor to determine the disk type, and remove the disk and any disk FRUs, e.g., the disk GBICs 24k, l, from the suspect list 112. Control proceeds to block 264 to prompt the administrator to retry the test from the start at block 200 in FIG. 3 to test the SAN with the new fiber 12d, e.

If (at block 260) the test with the new fiber did not succeed, then the state machine 102 removes (at block 266) the device port fiber 12d, e from the suspect list 112. The REST_DPORT_FIBER descriptor is called (at block 268) to instruct the administrator to reinstall the previously removed fiber link because the replaced fiber was not one cause of the failure. IS_DISK is called (at block 270) to determine the disk type. The state machine 102 then calls (at block 272) the REP_DEV descriptor to instruct the administrator to replace FRUs, e.g., GBIC, MIA, etc., in the storage device interface 20a, b. The DPORT_TEST descriptor is called (at block 274) to isolate test the device interface. If (at block 276) the test succeeds, then the state machine 102 calls (at block 278) the IS_DISK descriptor to determine the disk type to remove the disk FRUs from the suspect list 112. Control then proceeds to block 264 to prompt the administrator to retry the test with the new disk components. If the test did not succeed, i.e., the disk interface FRUs were not the source of the problem, then control proceeds (at block 280) to block 300 in FIG. 5 to isolate the storage device 8.

Figure 5:
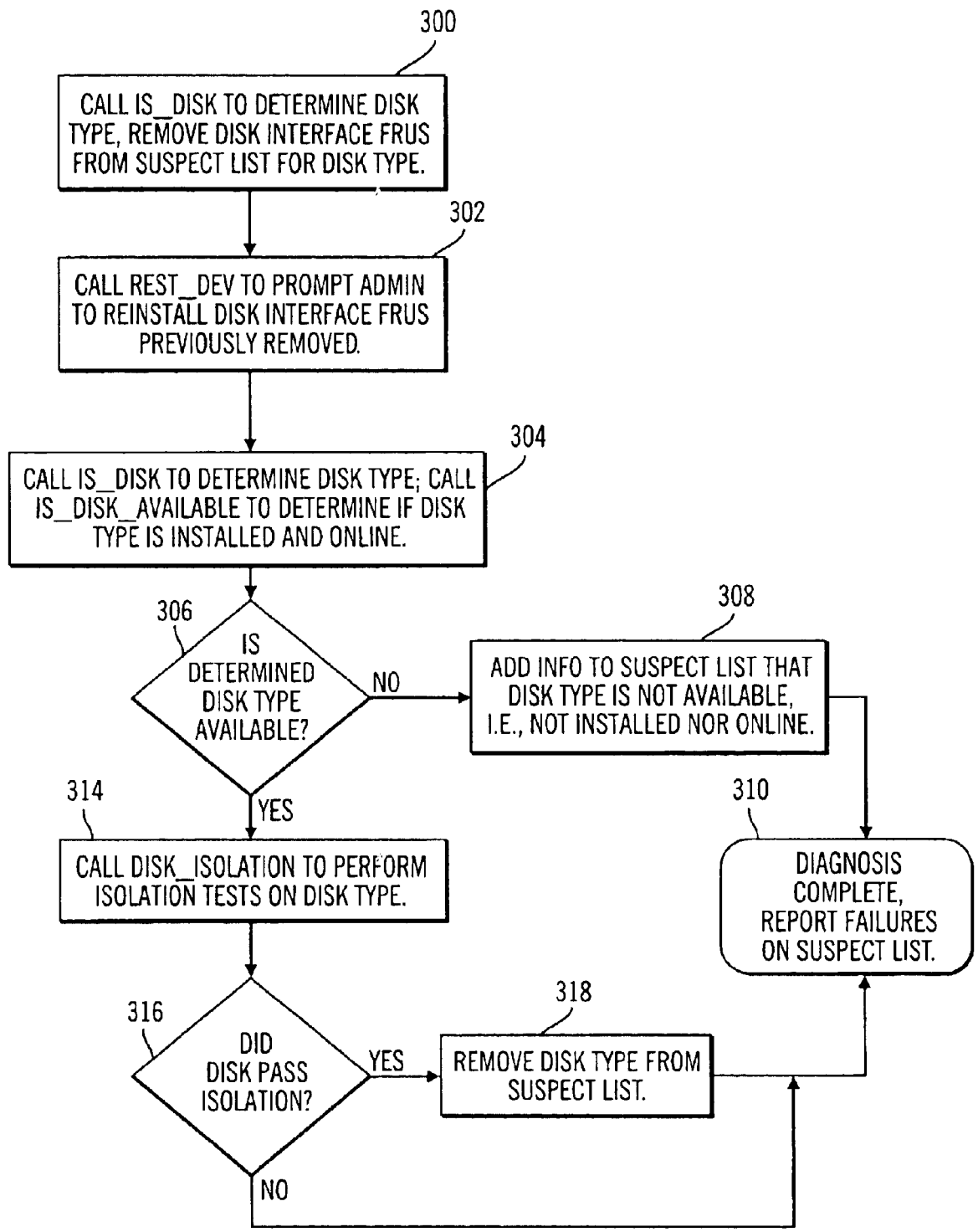

With respect to FIG. 5, to isolate the storage device, such as the disks in the storage device, the state machine 102 calls (at block 300) the IS_DISK descriptor to determine the disk type, and remove the disk interface 20a, b FRUs, e.g., GBIC 24k, l, from the suspect list 112. The REST_DEV descriptor is called (at block 302) to instruct the administrator to reinstall the previously removed device interface 20a, b FRUs, as these were not the source of the failure. The state machine 102 then calls (at block 304) IS_DISK to determine the disk type, and then calls IS_DISK_AVAILABLE to determine whether the determined disk type is installed and online. If (at block 306) the disk is not available, then the state machine adds (at block 308) information to the suspect list 112 indicating that the disk is not available, e.g., not installed nor online. The diagnosis then ends (at block 310) and reports the possible failing components on the suspect list 112, which from block 308 includes the disk. If the disk is available, then the state machine 102 calls (at block 314) the DISK_ISOLATION descriptor to run a series of isolation tests on the disk. If (at block 316) the disk passes the tests, then the disk type is removed (at block 318) from the suspect list 112 and the routine ends. Otherwise, if the disk does not pass the tests, then the test routine ends with the disk of the test storage device 8 on the suspect list 112. Note that because the isolation of the disks was performed after a newly added device interface 20a, b FRUs was added, if at block 316 the disk passes the test, then the entire SAN is tested and operational with the new device FRUs. If the diagnostic test is performed from the beginning with the new component, then the suspect list 112 includes the replaced component to remind the administrator that a suspect component was removed.

Figure 6:
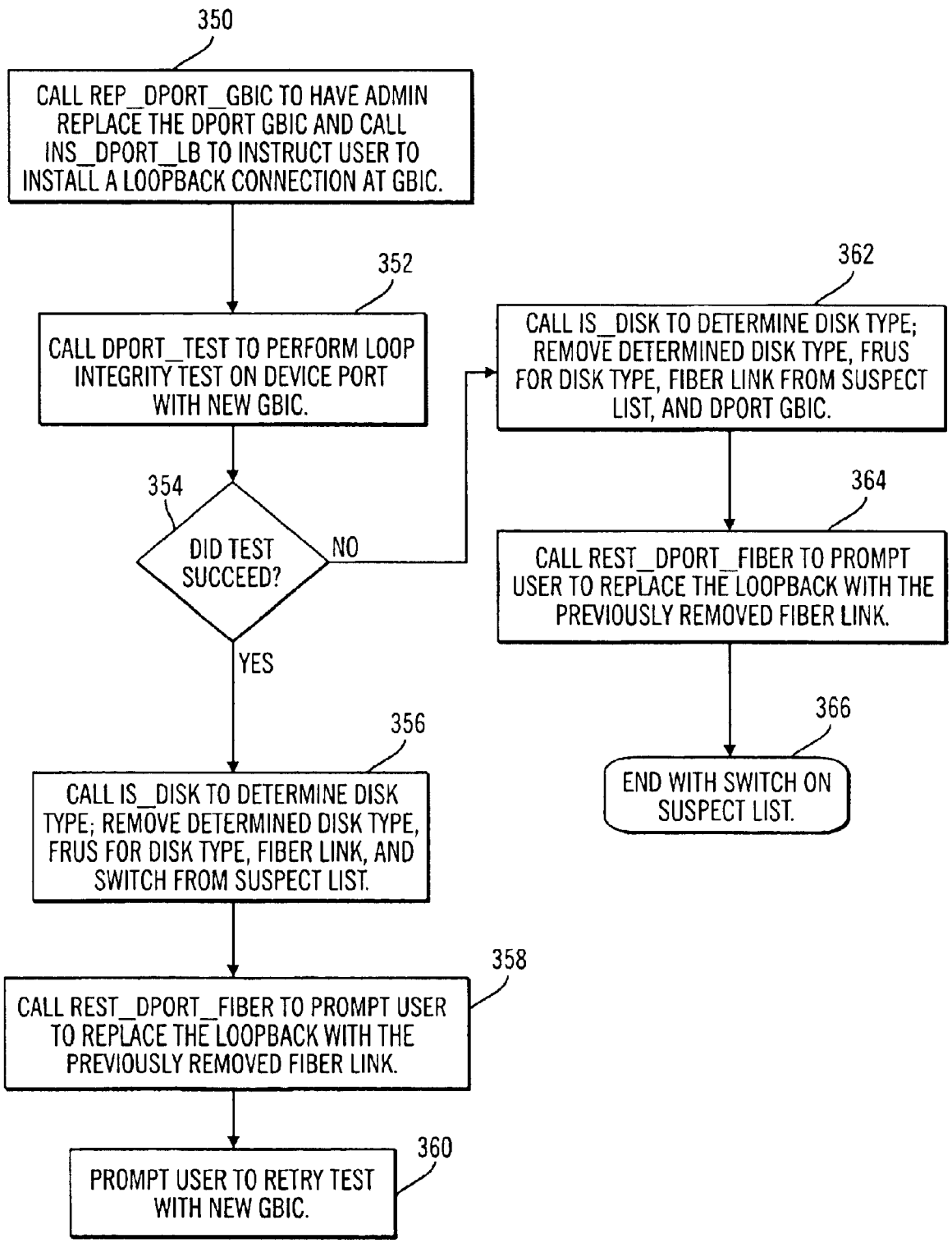

With reference to FIG. 3, if (at block 230), the isolated device port 22c, d did not pass the tests, then control proceeds (at block 234) to block 350 in FIG. 6 to further isolate components at the device port. With respect to FIG. 6, the state machine 102 calls (at block 350) the REP_ DPORT_GBIC descriptor to instruct the administrator to replace the device port GBIC 24i, j and calls INS_DPORT_LB to instruct the administrator to install the loopback connection for loopback testing of the device port GBIC 24i, j. The descriptor DPORT_TEST is called (at block 352) to perform the diagnostic test on the device port 22c, d with the new GBIC. If (at block 354) the test succeeds, then the replaced device port GBIC can be assumed to have been one source of the failure, and the state machine 102 calls (at block 356) IS_DISK to determine the disk type and remove from the suspect list 112 the FRUs for the determined disk type, e.g., GBIC 24k, l, the disk type, the fiber link, and the switch. The descriptor REST_DPORT_FIBER is called (at block 358) to instruct the administrator to replace the loopback connection with the previously removed fiber link, which was not the source of the error. The state machine 102 then prompts (at block 360) the administrator to retry the diagnostic test with the new device port GBIC 24i, j. If (at block 354) the test with the new device port GBIC did not pass, then the replaced device port GBIC 24i, j could not have been the sole source of the error. In such case, the state machine 102 calls the IS_DISK descriptor (at block 362) to determine the disk type, and removes the determined disk type, FRUs for the determined disk type, the fiber link, and the device port GBIC 24i, j from the suspect list 112. The REST_DPORT_FIBER descriptor is called (at block 364) to instruct the administrator to replace the previously removed fiber link 12e, d. At this point, the test ends (at block 366) with the switch, i.e., fabric 10, remaining on the suspect list 112.

Figure 7:
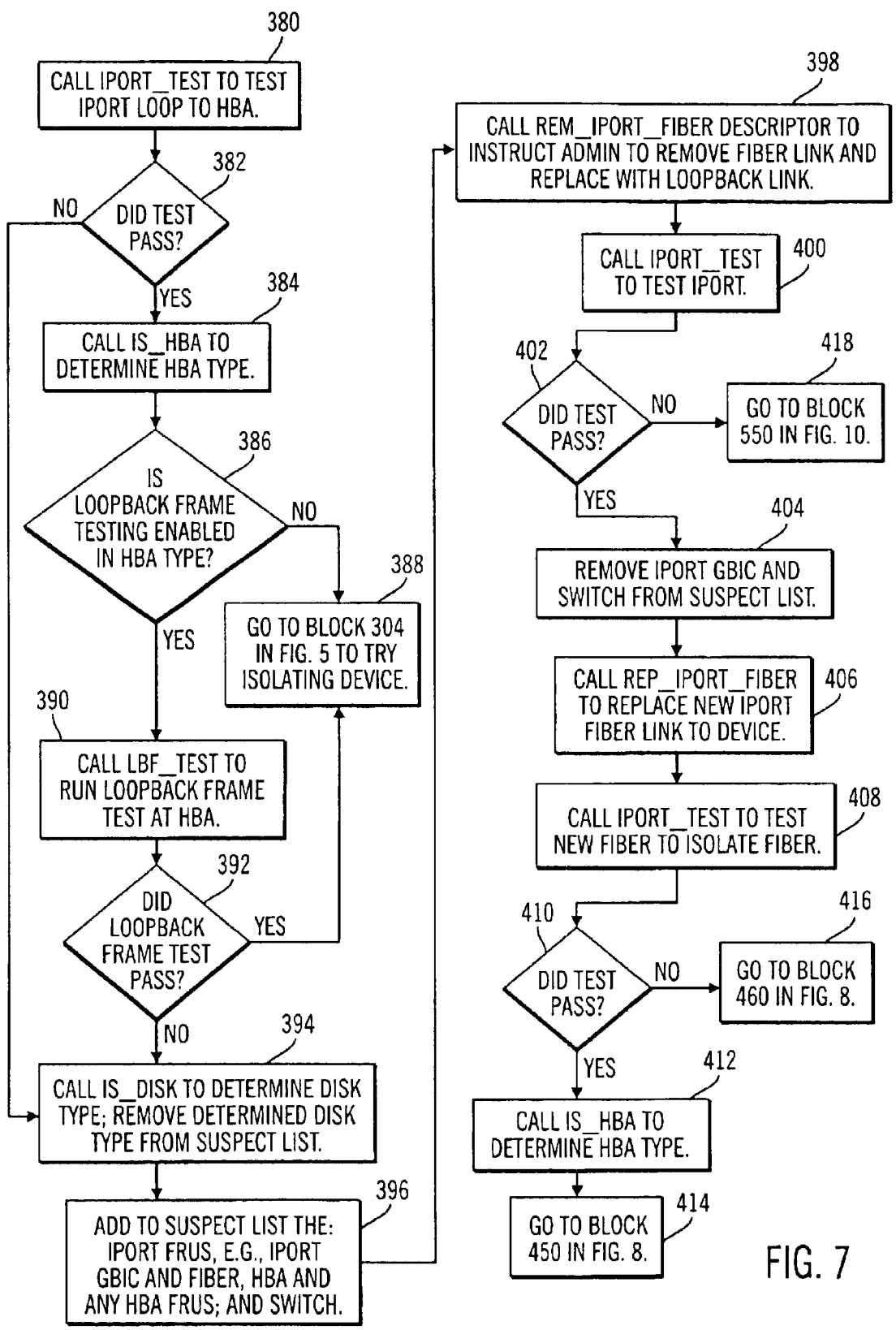

If (at block 214) the switched path from the device port 22c, d to the storage device 8 did pass the DPORT_TEST, then control proceeds (at block 213) to block 380 in FIG. 7 to test the path from the initiator port 22a, b in the fabric 10 to the host bus adaptor (HBA) 14a, 18a. With respect to FIG. 7, the state machine 102 calls (at block 380) the IPORT_TEST descriptor to determine whether the path between one host adaptor 14a, 18a and the initiator port 22a, b in the fabric 10 is functioning properly. If (at block 382) the path passes the tests, then the IS_HBA descriptor is called (at block 384) to determine the host adaptor type.

If (at block 386) the determined host adaptor type is one that does not support loopback frame testing, then the state machine 102 proceeds (at block 388) to block 304 in FIG. 5 to isolate the storage device 8 because the initiator port 22a, b passed the test. Otherwise, if loopback frame testing is supported, the LBF_TEST descriptor is called (at block 390) to run a loopback frame test at the host adaptor 14a, 18a. If (at block 392) the loopback test passed, then the host adaptor 14a, 18a proceeds (at block 388) to block 304 in FIG. 5 to isolate the storage device 8. If the test of the path from the host 2, 4 to the fabric 10 failed at blocks 382 or 392, then the state machine 102 calls (at block 394) IS_DISK to determine the disk type and removes the determined disk type from the suspect list because the fault likely lies in the path between the host adaptor 14a, 14b and the initiator port 22a, b. Accordingly, also added (at block 396) to the suspect list 112 are the FRUs for the initiator port, e.g., the GBICs 24g, h, the fiber 12a, c, the host adaptors 14a, 18a, any host adaptor FRUs, e.g., GBICs 24a, 24e, and the switch 10.

To begin fault isolation of the path between the host 2, 4 and the fabric 10, the state machine 102 calls (at block 398) the REM_IPORT_FIBER to instruct the administrator to remove the link and install the loopback connection for loopback testing at the initiator port 22a, b. The IPORT_TEST descriptor is called (at block 400). If (at block 402) the test passes, then the error must be in the fiber 12a, c or the host adaptor 14a, 18a, and the state machine 102 removes (at block 404) the initiator port 22a, b, any initiator port FRUs, e.g., the GBICs 24g, h, the fabric 10 or switch. The state machine 102 then calls (at block 406) the REP_IPORT_FIBER descriptor to instruct the administrator to replace the fiber 12a, c connecting the host 2, 4 to the fabric 10. The IPORT_TEST descriptor is then called (at block 408) to test the new fiber. If (at block 410) the test passed, then the IS_HBA descriptor is called (at block 412) to determine the host adaptor type. Control proceeds (at block 414) to block 450 in FIG. 8 to perform additional testing of the host adaptor if (at block 450) loopback frame testing is enabled in the host adaptor type. If so, then the LBF_TEST is called (at block 452) to run a loopback frame test at the host adaptor 14a, 18a. If the loopback frame test passes or the loopback connection is not installed at the host adaptor 14a, b, then the error is assumed to be in the fiber 12a, c. In such case, the state machine 102 calls (at block 456) IS_HBA to determine the host adaptor type and remove the host adaptor and any host adaptor FRUs from the suspect list. The user is then prompted (at block 458) to retry the diagnostic test with the new fiber between the host 2, 4 and the fabric 10.

If the loopback frame test did not pass at block 454 or the IPORT_TEST at block 410 on the new fiber did not pass, then the error is not in the fiber because replacing the fiber did not eliminate the failure. In such case, the state machine 102 calls (at block 460) REST_IPORT_FIBER to prompt the administrator to replace the fiber with the previously removed fiber and removes (at block 462) the initiator port fiber 12a, c from the suspect list 112. The state machine 102 then calls (at block 464) the REM_HBA_FIBER descriptor to remove the connection of the host bus adaptor 14a, 18a to the fiber 12a, c to isolate test the host adaptor 14a, 18a. The IS_HBA descriptor is called (at block 466) to determine the host adaptor type, which is then used to determine the appropriate HBA_TEST descriptor to call to test the host adaptor 14a, 18a, which is called (at block 466) to test the host adaptor 14a, 18a. If (at block 468) the host adaptor 14a, 18a fails the test, then the host adaptor 14a, 18b is the cause of the failure. In such case, the host adaptor FRUs, e.g., the host adaptor GBICs 24a, e, are removed (at block 467) from the suspect list 112. The test then ends (at block 472) with the host adaptor remaining on the suspect list 112. Otherwise, if the host adaptor passed the test, then the host adaptor 14a, 18a is not the cause of the failure and control transfers to block 474 to remove the host adaptor from the suspect list 112. If (at block 476) the host adaptor type includes a replaceable GBIC, then the state machine 102 calls (at block 480) the INS_HBA_LB descriptor to instruct the administrator to install the loopback connection to allow loopback testing.

The state machine 102 then calls (at block 480) the HBA_GBIC_TEST descriptor to test the host adaptor GBIC 24a, e. If (at block 482) the test passes, then all components have passed the test. In such case, the REST_HBA_FIBER descriptor is called (at block 484) to reconnect the host adaptor 14a, 18a to the fiber 12a, c and the remaining components, e.g., the host adaptor GBIC, are removed (at block 486) from the suspect list 112. At this point, the administrator would be prompted to retry the test as the error may be of an intermittent nature and not detected during the previous diagnostic test.

Figure 9:
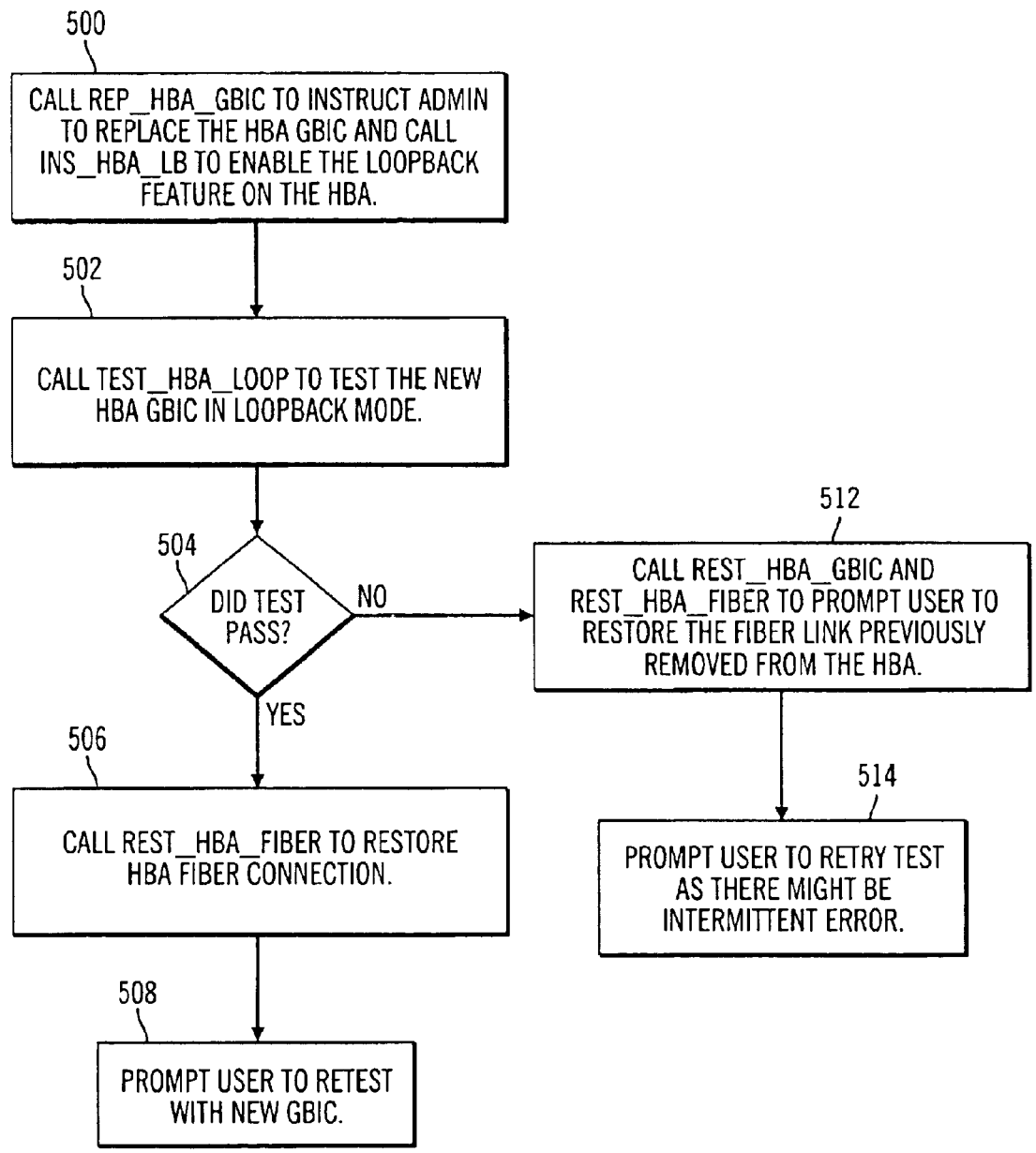

If (at block 482) the host adaptor GBIC 14a, 18a did not pass the test, then control proceeds (at block 490) to block 500 in FIG. 9 to replace and retest the host adaptor GBIC with a new component. With respect to FIG. 9, at block 500, the state machine 102 calls the REP_HBA_GBIC descriptor to instruct the administrator to replace the host adaptor GBIC 24a, e with a new unit and calls INS_HBA_LB to install the loopback for loopback testing of the new GBIC. The state machine 102 then calls (at block 502) the TEST_HBA_LOOP to loopback test the new host adaptor GBIC. If (at block 504) the test passes, then the host adaptor GBIC can be assumed to be one source of the failure. In such case, the state machine 102 calls (at block 506) the REST_HBA_FIBER descriptor to instruct the administrator to reconnect the fiber 12a, c to the host adaptor 14a, 18a. The administrator is further prompted (at block 508) to retest the SAN with the new host adaptor GBIC to determine if any additional components are the source of the error. If (at block 504) the test of the new host adaptor GBIC did not pass, then all the components have been tested, and the error may be intermittent. In such case, the REST_HBA_FIBER is called (at block 512) to prompt the administrator to reconnect the fiber 12a, c to the host adaptor 14a, 18a and the administrator is prompted (at block 514) to retry the diagnostic test again. If (at block 476) the host adaptor does not have a GBIC, then control proceeds (at block 492) to block 512 in FIG. 9 to prompt the user to retry the test at block 514.

Figure 8:
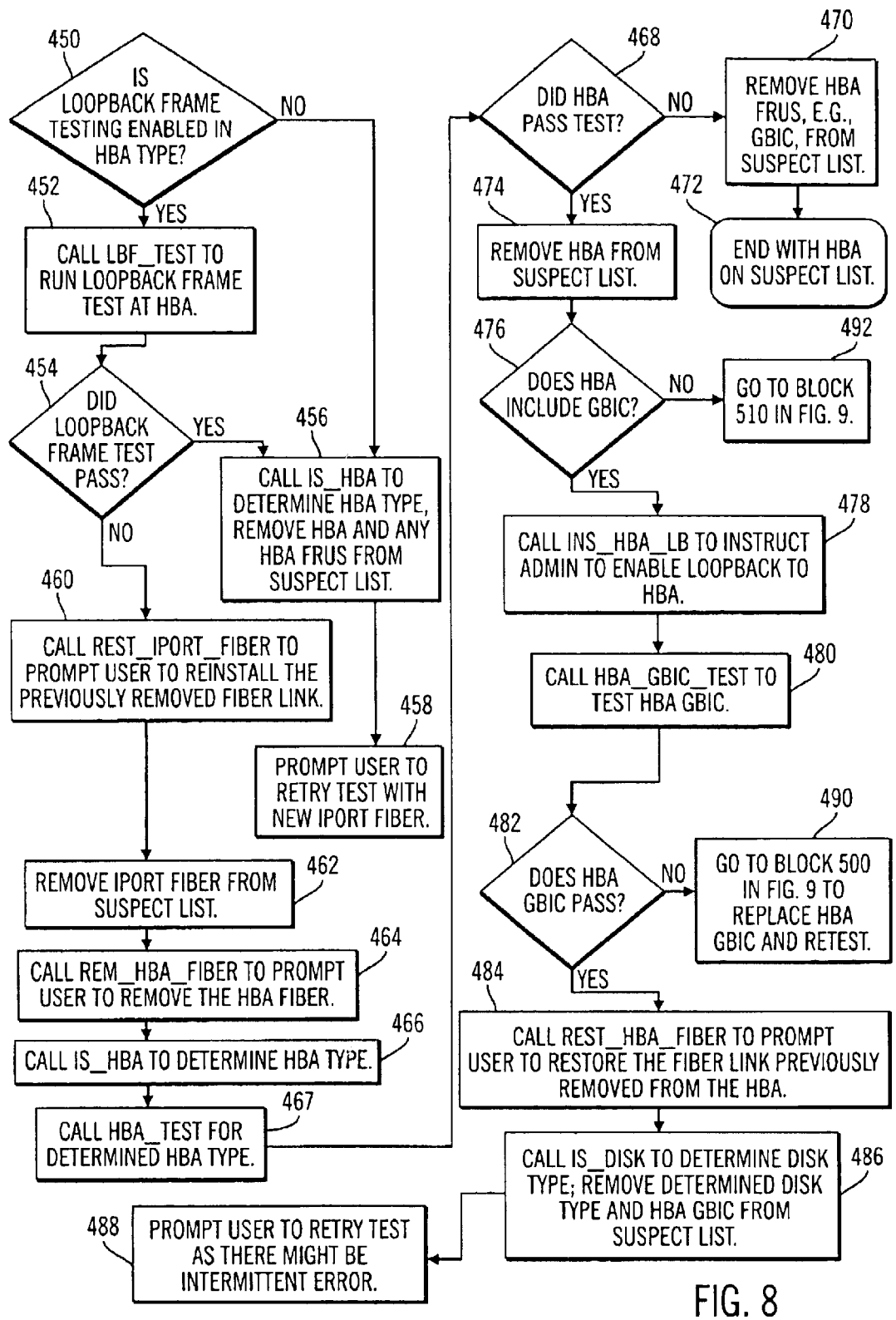

If (at block 410) the new fiber did not pass the fiber isolation test, then control proceeds (at block 416) to block 460 in FIG. 8 to reinstall the previously removed fiber and continue testing as the fiber is not the sole source of failure.

Figure 10:
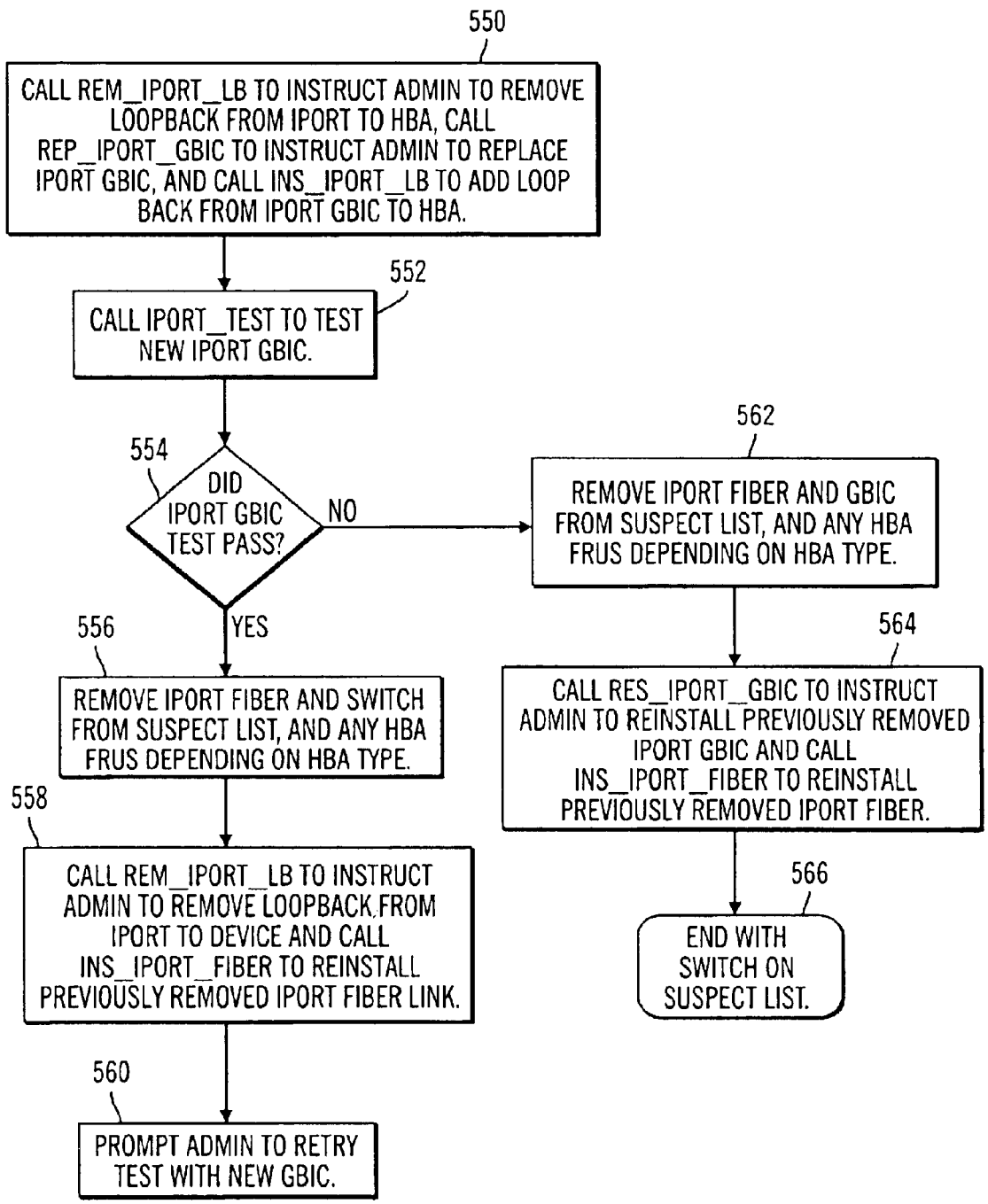

If (at block 402) the isolated initiator port 22a, b does not pass the IPORT_TEST, then control proceeds (at block 418) to block 550 in FIG. 10 to further test the initiator port 22a, b to pinpoint the source of the failure. With respect to FIG. 10, at block 550, the state machine 102 calls the REM_IPORT_LB, REP_IPORT_GBIC, and INS_IPORT_LB, which are similar to REM_DPORT_LB, REP_DPORT_GBIC, and INS_DPORT_LB except performed with respect to the initiator port 22a, b as opposed to the device port 22c, d. These test descriptors are called to instruct the administrator to replace the initiator port GBIC 24g, h to allow for isolation of the initiator port 22a, b FRUs. The IPORT_TEST descriptor is then called (at block 552) to test the new initiator port GBIC. If (at block 554) the new GBIC passes the test, then the initiator port GBIC may be assumed to be one source of failure. In such case, the state machine 102 removes the initiator port fiber, fabric 10, e.g., switch, and any host adaptor FRUs, e.g., GBIC 24a, b from the suspect list 112. The state machine then calls descriptors (at block 558) to reconnect the initiator port 22a, b to the fiber 12a, c and prompt (at block 560) the administrator to retry the test with the new GBIC. If the new initiator port GBIC did not pass the test, then the initiator port fiber 12a, c, initiator GBIC 24g, h, and any host adaptor FRUs are removed from the suspect list 112. At block 564, the state machine 102 calls descriptors to instruct the administrator to reinstall the previously removed GBIC. At block 566, the test ends with the fabric 10, i.e., switch, on the suspect list 112.

Figure 11:
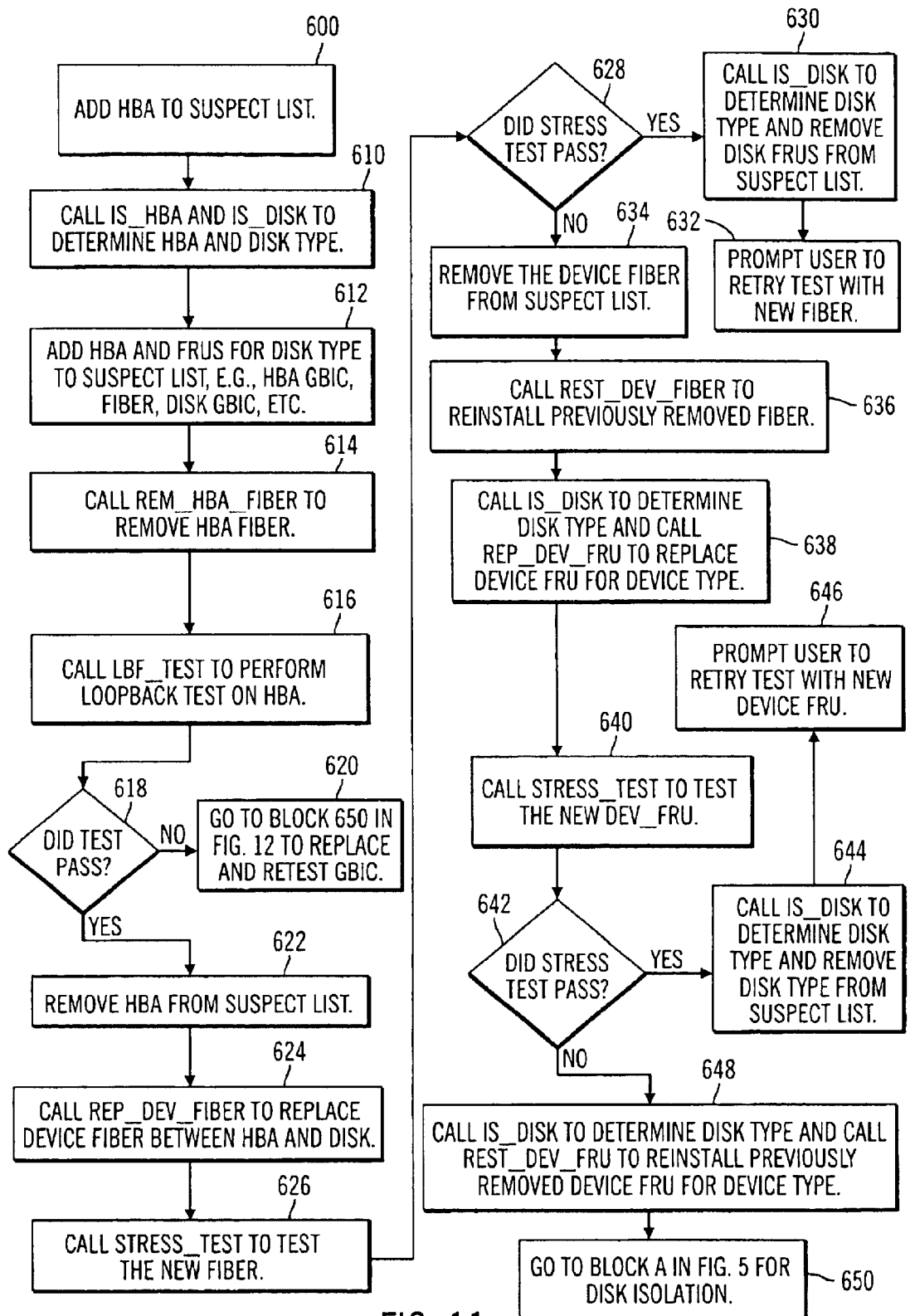
Figure 12:
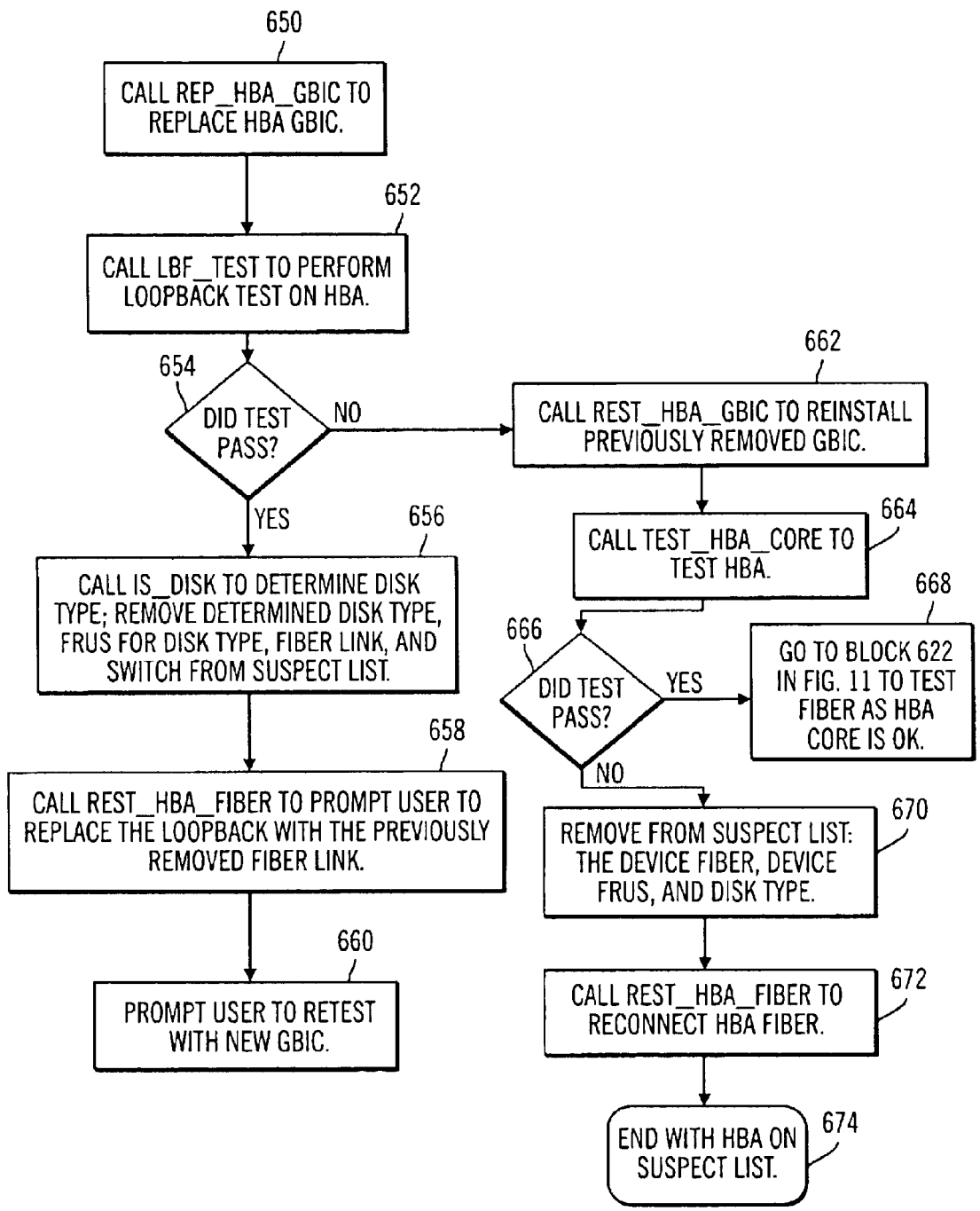

If (at block 210) the loop is not switched, i.e., a direct connection for the host 2, 4 and the storage device 6 as shown on paths using fibers 12b, f, then a series of diagnostic tests are performed, as described with respect to FIGS. 11 and 12 to isolate the host adaptor 14b, 18b, fiber 12b, f or storage device interface 16a, b components in a manner similar to that described above, except there are no fabric 10 components to test, such as the initiator and device ports and their GBIC.

Figure 13:
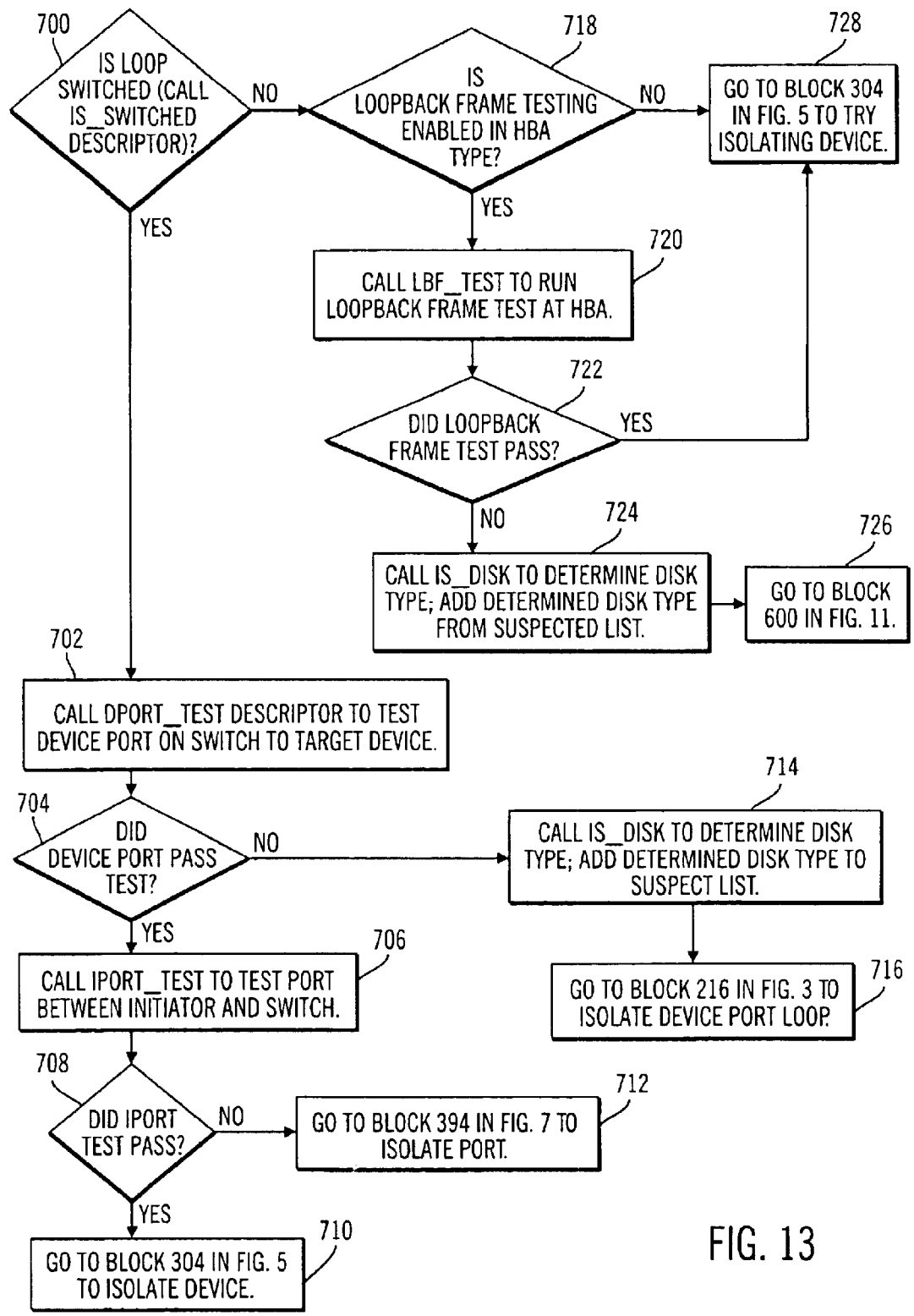

FIG. 13 illustrates test logic performed if at block 204 the SAN passes the initial STRESS_TEST. FIG. 13 performs additional isolation testing of the components even if the SAN passes the stress test to provide an additional layer of diagnostic testing of the individual components on the path.

The above described logic of FIGS. 3–13 provides isolation testing of different groups of the components of the path from a host to a storage device, which may include a fabric 10. The path components tested together and in isolation include the host adaptor, any host adaptor FRUs, the fiber, any fabric ports and FRUs, and the storage device interface and any interface FRUs. The above described testing technique provides consistent testing of the SAN system to allow for consistent and dependable system diagnosis.

To initiate the diagnostic routine at block 200 in FIG. 3, the administrator would specify a path, i.e., a host adaptor and storage device interface through a user interface. The diagnostic test may be invoked from one of the hosts 2, 4, or some other device in the system. When invoking the diagnostic test, the administrator may specify one or more of the following arguments to control the extent and operation of the diagnostic test:

verbose command: causes the state machine 102 to display all messages to a screen display and log files.

silent command: instructs the state machine 102 to record all messages to log files only.

read only: performs only data safe reading while testing. This limits the extent of the testing as write operations are not performed during component diagnostics.

write-read: performs destructive write/read testing, allowing for all types of diagnostic testing.

quick: performs abbreviated testing.

aggressive: executes extensive testing.

everything: tests all qualified disks in a storage device that may be reached through a path. With this setting, during disk isolation all disks would be tested.

targeted: instructs the state machine 102 to only test specified disks during disk isolation and not all disks accessible through the specified storage device interface.

interactive: instructs the state machine 102 to allow the user to interact with the state machine to perform manual fault isolation. This arrangement causes the state machine to instruct the administrator to plug and unplug components as the rules evaluate the results to determine the faulty FRU.

Once the expert diagnostic tool 100 is invoked with the above arguments, the state machine 102 records a start record with a timestamp into the activity log and processes the rule base completely for each specified disk. When the state machine encounters the end of the rule base, it records the state of the tested storage path as COMPLETED or FAILED. If FAILED, the activity log records the name of the log(s) that contain failed test data, such as the suspect list 112. These error log files contain important information that should accompany the failed component(s) back to the repair station, such as the suspect list 112 that indicates components that may be the source of the failure.

What follows are some alternative implementations for the preferred embodiments.

The described implementations may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Field Programmable Gate Array (FPGA), Application Specific Integrated Circuit (ASIC), etc.) or a computer readable medium (e.g., magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. The code in which preferred embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Of course, those skilled in the art will recognize that many modifications may be made to this configuration without departing from the scope of the present invention, and that the article of manufacture may comprise any information bearing medium known in the art.

In the discussed implementations, the flow of the diagnostic test logic is provided in a rule base object which references descriptors that specify one or more program modules to execute to implement the diagnostic testing. In additional embodiments, different program architectures may be used for the expert diagnostic tool to associate descriptors or program objects with different functions called according to the diagnostic test operations.

The diagnostic program may communicate requests for manual operations, e.g., disconnecting, removing and/or replacing components, through a displayable user interface, voice commands, printed requests or any other output technique known in the art for communicating information from a computer system to a person.

The described implementations referenced storage systems including GBICs, fabrics, and other SAN related components. In alternative embodiments, the storage system may comprise more or different types of replaceable units than those mentioned in the described implementations. Further, the diagnostic system may utilize different tests for different component types that are tested with the described diagnostic tool.

In the described implementations, the storage devices tested comprised hard disk drive storage units. Additionally, the tested storage devices may comprise tape systems, optical disk systems or any other storage system known in the art. Still further, the diagnostic tool may apply to storage networks using protocols other than the Fibre Channel protocol.

In the described implementations the system tested comprised a storage system. In alternative implementations, the system may include input/output (I/O) devices other than storage devices including an adaptor or interface for network communication, such that the described testing techniques can be applied to any network of I/O devices, not just storage systems.

In the described embodiments, the expert diagnostic software tool is executed from a host system. Additionally, the expert diagnostic tool may be executed from one of the storage devices or from another system.

In the described implementations, the tested system included only one switch between a host and storage device. In additional implementations, there may be multiple switches between the host and target storage device. In such case, each switch and component thereof on the path from the host and target storage device would have to be tested and diagnosed.

The foregoing description of various implementation of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A computer implemented diagnostic method for automatically diagnosing a system by:
   determining a path in the system to test, wherein the path includes path components including at least a host adaptor, a link, a device interface, and a device, wherein the device comprises a storage system;
   performing an initial test to determine if there is a failure in the path;
   adding at least one of the path components to a suspect list capable of being a cause of the failure, wherein the suspect list is implemented in a computer readable data structure;
   performing at least one isolation test on at least one of the path components added to the suspect list;
   receiving input from a user indicating one or more storage areas to test in the storage system, wherein isolation tests on the storage system are performed with respect to those storage areas indicated by the user;
   removing the tested path component from the suspect list if the isolation test confirms that the tested path component cannot be a source of the failure; and
   returning the suspect list to the user to provide information on the path components capable of being the cause of the failure.

2. The method of claim 1, wherein the initial test comprises a test of the path, and wherein path components are added to the suspect list and isolation tested after the initial test indicates a path failure.

3. The method of claim 1, wherein the initial test comprises a test of the path, and wherein path components are added to the suspect list and isolation tested after the initial test indicates no path failure to provide additional testing of the path components.

4. The method of claim 1, wherein isolation testing the host adaptor comprises: generating output to instruct the user to disconnect the host adaptor from the link, wherein the isolation test is performed on the host adaptor after the user provides input indicating that the host adaptor was disconnected, wherein the host adaptor is removed from the suspect list if the host adaptor passes a diagnostic test.

5. The method of claim 4, further comprising:
   generating output to instruct the user to replace the link if the host adaptor passes the test;
   performing a link isolation test on the path with a replacement link; and
   removing path components from the suspect list if the link isolation test on the replaced link indicates that the link was one cause of the failure.

6. The method of claim 5, wherein if the link isolation test indicates that the link is not one cause of the failure, further performing:
   removing the link from the suspect list;
   generating output to instruct the user to reinstall the previously replaced link; and
   performing a device interface isolation test of the device interface.

7. The method of claim 6, further comprising:
   generating output to instruct the user to disconnect the device interface from the link to allow for isolation testing of the device interface.

8. The method of claim 6, wherein if the device interface isolation test indicates that the device interface is not one cause of the failure, further performing:
   removing the device interface from the suspect list; and
   performing a device isolation test of the device.

9. The method of claim 1, wherein performing the isolation testing of the host adaptor and device interface comprises additional isolation testing of field replaceable units within the host adaptor and device interface.

10. The method of claim 1, further comprising:
    determining whether the path components include at least one switch, device port, initiator port, and links therebetween, wherein the host adaptor connects through an initial link to an initiator port on the switch and the device interface connects through a second link to a device port on the switch; and
    performing isolation testing on the switch, device port, initiator port, and the first and second links if the path includes the switch.

11. The method of claim 1, further comprising:
    receiving input from the user indicating a level of testing, wherein the extent of the isolation tests are determined by the user indicated testing level.

12. The method of claim 1, wherein the storage system adheres to a Fibre Channel protocol and architecture and the link comprises an optical fiber wire.

13. The method of claim 1, wherein the system is capable of including different types of host adaptors and device interfaces, wherein there is a separate isolation test for each of the different types of host adaptors and device interfaces that are capable of being included in the system, and wherein performing an isolation test with respect to one host adaptor or device interface comprises:
    determining a type of the host adaptor or device interface; and
    performing the isolation test for the determined type of host adaptor or device interface.

14. A system comprising:
    (a) a storage system including a plurality of path components comprising:
        (i) a host adaptor;
        (ii) a link;
        (iii) a device interface; and
        (iv) a device, wherein the device comprises a second storage system, wherein the second storage system comprises storage areas;
    (b) a processor;
    (c) a computer readable medium accessible to the processor;
    (d) a suspect list embedded in the computer readable medium; and
    (e) a diagnostic software embedded in the computer readable medium capable of causing the processor to perform:
        (i) performing an initial test to determine if there is a failure in the path;
        (ii) adding at least one of the path components to a suspect list capable of being a cause of the failure;
        (iii) performing at least one isolation test on at least one of the path components added to the suspect list;

(iv) receiving input from a user indicating storage areas to test in the second storage system, wherein isolation tests on the second storage system are performed with respect to those storage areas indicated by the user;

(v) removing the tested path component from the suspect list if the isolation test confirms that the tested path component cannot be a source of the failure; and (vi) returning the suspect list to the user to provide information on the path components capable of being the cause of the failure.

15. The system of claim 14, wherein the initial test comprises a test of the path, and wherein path components are added to the suspect list and isolation tested after the first test indicates a path failure.

16. The system of claim 14, wherein the first test comprises a test of the path, and wherein path components are added to the suspect list and isolation tested after the first test indicates no path failure to provide additional testing of the path components.

17. The system of claim 14, wherein isolation testing the host adaptor comprises:

generating output to instruct the user to disconnect the host adaptor from the link, wherein the isolation test is performed on the host adaptor after the user provides input indicating that the host adaptor was disconnected, wherein the host adaptor is removed from the suspect list if the host adaptor passes a diagnostic test.

18. The system of claim 17, wherein the diagnostic software is further capable of causing the processor to perform:

generating output to instruct the user to replace the link if the host adaptor passes the test;

performing a link isolation test on the path with a replacement link; and removing path components from the suspect list if the link isolation test on the replaced link indicates that the link was one cause of the failure.

19. The system of claim 18, wherein if the link isolation test indicates that the link is not one cause of the failure, then the diagnostic software is further capable of causing the processor to perform:

removing the link from the suspect list;

generating output to instruct the user to reinstall the previously replaced link; and performing a device interface isolation test of the device interface.

20. The system of claim 19, wherein the diagnostic software is further capable of causing the processor to perform:

generating output to instruct the user to disconnect the device interface from the link to allow for isolation testing of the device interface.

21. The system of claim 19, wherein if the device interface isolation test indicates that the device interface is not one cause of the failure, further performing:

removing the device interface from the suspect list; and performing a device isolation test of the device.

22. The system of claim 14, wherein performing the isolation testing of the host adaptor and device interface comprises additional isolation testing of field replaceable units within the host adaptor and device interface.

23. The system of claim 14, wherein the diagnostic software is further capable of causing the processor to perform:

determining whether the path components include at least one switch, device port, initiator port, and links therebetween, wherein the host adaptor connects through a first link to an initiator port on the switch and the device interface connects through a second link to a device port on the switch; and performing isolation testing on the switch, device port, initiator port, and the first and second links if the path includes the switch.

24. The system of claim 14, wherein the diagnostic software is further capable of causing the processor to perform:

receiving input from the user indicating a level of testing, wherein the extent of the isolation tests are determined by the user indicated testing level.

25. The system of claim 14, wherein the second storage system adheres to a Fibre Channel protocol and architecture and the link comprises an optical fiber wire.

26. The system of claim 14, wherein the system is capable of including different types of host adaptors and device interfaces, wherein there is a separate isolation test for each of the different types of host adaptors and device interfaces that are capable of being included in the system, and wherein performing an isolation test with respect to one host adaptor or device interface comprises:

determining a type of the host adaptor or device interface; and performing the isolation test for the determined type of host adaptor or device interface.

27. An article of manufacture for implementing a diagnostic tool for automatically diagnosing a system, wherein the diagnostic tool is embedded in a computer readable medium and includes code capable of causing a processor to perform:

determining a path in the system to test, wherein the path includes path components including at least a host adaptor, a link, a device interface, and a device, wherein the device comprises a storage system, wherein the storage system comprises storage areas;

performing an initial test to determine if there is a failure in the path;

adding at least one of the path components to a suspect list capable of being a cause of the failure, wherein the suspect list is implemented in a computer readable data structure;

performing at least one isolation test on at least one of the path components added to the suspect list;

receiving input from a user indicating storage areas to test in the storage system, wherein isolation tests on the storage system are performed with respect to those storage areas indicated by the user;

removing the tested path component from the suspect list if the isolation test confirms that the tested path component cannot be a source of the failure; and returning the suspect list to the user to provide information on the path components capable of being the cause of the failure.

28. The article of manufacture of claim 27, wherein the initial test comprises a test of the path, and wherein path components are added to the suspect list and isolation tested after the initial test indicates a path failure.

29. The article of manufacture of claim 27, wherein the initial test comprises a test of the path, and wherein path components are added to the suspect list and isolation tested after the initial test indicates no path failure to provide additional testing of the path components.

30. The article of manufacture of claim 27, wherein isolation testing the host adaptor comprises:
  generating output to instruct the user to disconnect the host adaptor from the link, wherein the isolation test is performed on the host adaptor after the user provides input indicating that the host adaptor was disconnected, and wherein the host adaptor is removed from the suspect list if the host adaptor passes a diagnostic test.

31. The article of manufacture of claim 30, wherein the diagnostic tool code is further capable of causing the processor to perform:
  generating output to instruct the user to replace the link if the host adaptor passes the test;
  performing a link isolation test on the path with a replacement link; and
  removing path components from the suspect list if the isolation test on the replaced link indicates that the link was one cause of the failure.

32. The article of manufacture of claim 31, wherein if the isolation test indicates that the link is not one cause of the failure, and wherein the diagnostic tool code is further capable of causing the processor to perform:
  removing the link from the suspect list;
  generating output to instruct the user to reinstall the previously replaced link; and
performing a device interface isolation test of the device interface.

33. The article of manufacture of claim 32, wherein the diagnostic tool code is further capable of causing the processor to perform:
  generating output to instruct the user to disconnect the device interface from the link to allow for isolation testing of the device interface.

34. The article of manufacture of claim 32, wherein if the device interface isolation test indicates that the device interface is not one cause of the failure, further performing:
  removing the device interface from the suspect list; and
  performing a device isolation test of the device.

35. The article of manufacture of claim 27, wherein performing the isolation testing of the host adaptor and device interface comprises additional isolation testing of field replaceable units within the host adaptor and device interface.

36. The article of manufacture of claim 27, wherein the diagnostic tool code is further capable of causing the processor to perform:
  determining whether the path components include at least one switch, device port, initiator port, and links therebetween, wherein the host adaptor connects through an initial link to an initiator port on the switch and the device interface connects through a second link to a device port on the switch; and
  performing isolation testing on the switch, device port, initiator port, and the first and second links if the path includes the switch.

37. The article of manufacture of claim 27, wherein the diagnostic tool code is further capable of causing the processor to perform:
  receiving input from the user indicating a level of testing, wherein the extent of the isolation tests are determined by the user indicated testing level.

38. The article of manufacture of claim 27, wherein the system is capable of including different types of host adaptors and device interfaces, wherein there is a separate isolation test for each of the different types of host adaptors and device interfaces that are capable of being included in the system, and wherein the diagnostic tool code is further capable of causing the processor to perform an isolation test with respect to one host adaptor or device interface comprising:
  determining a type of the host adaptor or device interface; and
  performing the isolation test for the determined type of host adaptor or device interface.

39. A computer implemented diagnostic method for automatically diagnosing a system by:
  determining a path in the system to test, wherein the path includes path components including at least a host adaptor, a link, a device interface, and a device;
  performing an initial test to determine if there is a failure in the path;
  adding at least one of the path components to a suspect list capable of being a cause of the failure, wherein the suspect list is implemented in a computer readable data structure;
  performing at least one isolation test on at least one of the path components added to the suspect list, wherein isolation testing the host adaptor comprises generating output to instruct a user to disconnect the host adaptor from the link, wherein the isolation test is performed on the host adaptor after the user provides input indicating that the host adaptor was disconnected;
  removing the tested path component from the suspect list if the isolation test confirms that the tested path component cannot be a source of the failure, wherein the host adaptor is removed from the suspect list if the host adaptor passes a diagnostic test; and
  returning the suspect list to the user to provide information on the path components capable of being the cause of the failure.

40. The method of claim 39, further comprising:
generating output to instruct the user to replace the link if the host adaptor passes the test;
performing a link isolation test on the path with a replacement link; and
removing path components from the suspect list if the link isolation test on the replaced link indicates that the link was one cause of the failure.

41. The method of claim 40, wherein if the link isolation test indicates that the link is not one cause of the failure, further performing:
  removing the link from the suspect list;
  generating output to instruct the user to reinstall the previously replaced link; and
  performing a device interface isolation test of the device interface.

42. The method of claim 41, further comprising:
  generating output to instruct the user to disconnect the device interface from the link to allow for isolation testing of the device interface.

43. The method of claim 41, wherein if the device interface isolation test indicates that the device interface is not one cause of the failure, further performing:
  removing the device interface from the suspect list; and
  performing a device isolation test of the device.

44. The method of claim 39, further comprising:
  determining whether the path components include at least one switch, device port, initiator port, and links therebetween, wherein the host adaptor connects through an initial link to an initiator port on the switch and the device interface connects through a second link to a device port on the switch; and performing isolation testing on the switch, device port, initiator port, and the first and second links if the path includes the switch.

45. The method of claim 39, wherein the device comprises a storage system, wherein the storage system comprises storage areas, further comprising:

receiving input from the user indicating storage areas to test in the storage system, wherein isolation tests on the storage system are performed with respect to those storage areas indicated by the user.

46. A computer implemented diagnostic method for automatically diagnosing a system by:

determining a path in the system to test, wherein the path includes path components including at least a host adaptor, a link, a device interface, and a device;

determining whether the path components include at least one switch, device port, initiator port, and links therebetween, wherein the host adaptor connects through an initial link to an initiator port on the switch and the device interface connects through a second link to a device port on the switch;

performing an initial test to determine if there is a failure in the path;

adding at least one of the path components to a suspect list capable of being a cause of the failure, wherein the suspect list is implemented in a computer readable data structure;

performing at least one isolation test on at least one of the path components added to the suspect list;

performing isolation testing on the switch, device port, initiator port, and the first and second links if the path includes the switch;

removing the tested path component from the suspect list if the isolation test confirms that the tested path component cannot be a source of the failure; and returning the suspect list to a user to provide information on the path components capable of being the cause of the failure.

47. The method of claim 46, wherein isolation testing the host adaptor comprises: generating output to instruct the user to disconnect the host adaptor from the link, wherein the isolation test is performed on the host adaptor after the user provides input indicating that the host adaptor was disconnected, wherein the host adaptor is removed from the suspect list if the host adaptor passes a diagnostic test.

48. The method of claim 46, wherein the device comprises a storage system, wherein the storage system comprises storage areas, further comprising:

receiving input from the user indicating storage areas to test in the storage system, wherein isolation tests on the storage system are performed with respect to those storage areas indicated by the user.

49. A system comprising:

(a) a storage system including a plurality of path components comprising:
(i) a host adaptor;
(ii) a link;
(iii) a device interface; and
(iv) a device; and (b) a processor;

(c) a computer readable medium accessible to the processor;

(d) a suspect list embedded in the computer readable medium; and (e) a diagnostic software embedded in the computer readable medium capable of causing the processor to perform:
(i) performing an initial test to determine if there is a failure in the path;
(ii) adding at least one of the path components to a suspect list capable of being a cause of the failure;
(iii) performing at least one isolation test on at least one of the path components added to the suspect list;
(iv) generating output to instruct a user to disconnect the host adaptor from the link, wherein the isolation test is performed on the host adaptor after the user provides input indicating that the host adaptor was disconnected;
(v) removing the tested path component from the suspect list if the isolation test confirms that the tested path component cannot be a source of the failure, wherein the host adaptor is removed from the suspect list if the host adaptor passes a diagnostic test; and
(vi) returning the suspect list to the user to provide information on the path components capable of being the cause of the failure.

50. The system of claim 49, wherein the diagnostic software is further capable of causing the processor to perform:

generating output to instruct the user to replace the link if the host adaptor passes the test;

performing a link isolation test on the path with a replacement link; and removing path components from the suspect list if the link isolation test on the replaced link indicates that the link was one cause of the failure.

51. The system of claim 50, wherein if the link isolation test indicates that the link is not one cause of the failure, then the diagnostic software is further capable of causing the processor to perform:

removing the link from the suspect list;

generating output to instruct the user to reinstall the previously replaced link; and performing a device interface isolation test of the device interface.

52. The system of claim 51, wherein the diagnostic software is further capable of causing the processor to perform:

generating output to instruct the user to disconnect the device interface from the link to allow for isolation testing of the device interface.

53. The system of claim 51, wherein if the device interface isolation test indicates that the device interface is not one cause of the failure, further performing:

removing the device interface from the suspect list; and performing a device isolation test of the device.

54. The system of claim 49, wherein the diagnostic software is further capable of causing the processor to perform:

determining whether the path components include at least one switch, device, port, initiator port, and links therebetween, wherein the host adaptor connects through a first link to an initiator port on the switch and the device interface connects through a second link to a device port on the switch; and performing isolation testing on the switch, device port, initiator port, and the first and second links if the path includes the switch.

55. The system of claim 49, wherein the device comprises a second storage system, wherein the second storage system comprises storage areas, wherein the diagnostic software is further capable of causing the processor to perform:

receiving input from the user indicating storage areas to test in the second storage system, wherein isolation tests on the second storage system are performed with respect to those storage areas indicated by the user.

56. A system comprising:
(a) a storage system including a plurality of path components comprising:
 (i) a host adaptor;
 (ii) a link;
 (iii) a device interface; and
 (iv) a device; and
(b) a processor;
(c) a computer readable medium accessible to the processor;
(d) a suspect list embedded in the computer readable medium; and
(e) a diagnostic software embedded in the computer readable medium capable of causing the processor to perform:
 (i) determining whether the path components include at least one switch, device port, initiator port, and links therebetween, wherein the host adaptor connects through a first link to an initiator port on the switch and the device interface connects through a second link to a device port on the switch;
 (ii) performing an initial test to determine if there is a failure in the path;
 (iii) adding at least one of the path components to a suspect list capable of being a cause of the failure;
 (iv) performing at least one isolation test on at least one of the path components added to the suspect list;
 (v) performing isolation testing on the switch, device port, initiator port, and the first and second links if the path includes the switch;
 (vi) removing the tested path component from the suspect list if the isolation test confirms that the tested path component cannot be a source of the failure: and
 (vii) returning the suspect list to a user to provide information on the path components capable of being the cause of the failure.

57. The system of claim 56, wherein isolation testing the host adaptor comprises:

generating output to instruct the user to disconnect the host adaptor from the link, wherein the isolation test is performed on the host adaptor after the user provides input indicating that the host adaptor was disconnected, wherein the host adaptor is removed from the suspect list if the host adaptor passes a diagnostic test.

58. The system of claim 56, wherein the device comprises a second storage system, wherein the second storage system comprises storage areas, wherein the diagnostic software is further capable of causing the processor to perform:

receiving input from the user indicating storage areas to test in the second storage system, wherein isolation tests on the second storage system are performed with respect to those storage areas indicated by the user.

59. An article of manufacture for implementing a diagnostic tool for automatically diagnosing a system, wherein the diagnostic tool is embedded in a computer readable medium and includes code capable of causing a processor to perform:

determining a path in the system to test, wherein the path includes path components including at least a host adaptor, a link, a device interface, and a device;

performing an initial test to determine if there is a failure in the path;

adding at least one of the path components to a suspect list capable of being a cause of the failure, wherein the suspect list is implemented in a computer readable data structure;

performing at least one isolation test on at least one of the path components added to the suspect list;

generating output to instruct a user to disconnect the host adaptor from the link, wherein the isolation test is performed on the host adaptor after the user provides input indicating that the host adaptor was disconnected;

removing the tested path component from the suspect list if the isolation test confirms that the tested path component cannot be a source of the failure, wherein the host adaptor is removed from the suspect list if the host adaptor passes a diagnostic test; and returning the suspect list to the user to provide information on the path components capable of being the cause of the failure.

60. The article of manufacture of claim 59, wherein the diagnostic tool code is further capable of causing the processor to perform:

generating output to instruct the user to replace the link if the host adaptor passes the test;

performing a link isolation test on the path with a replacement link; and removing path components from the suspect list if the isolation test on the replaced link indicates that the link was one cause of the failure.

61. The article of manufacture of claim 60, wherein if the isolation test indicates that the link is not one cause of the failure, and wherein the diagnostic tool code is further capable of causing the processor to perform:

removing the link from the suspect list;

generating output to instruct the user to reinstall the previously replaced link; and performing a device interface isolation test of the device interface.

62. The article of manufacture of claim 61, wherein the diagnostic tool code is further capable of causing the processor to perform:

generating output to instruct the user to disconnect the device interface from the link to allow for isolation testing of the device interface.

63. The article of manufacture of claim 61, wherein if the device interface isolation test indicates that the device interface is not one cause of the failure, further performing:

removing the device interface from the suspect list; and performing a device isolation test of the device.

64. The article of manufacture of claim 59, wherein the diagnostic tool code is further capable of causing the processor to perform:

determining whether the path components include at least one switch, device port, initiator port, and links therebetween, wherein the host adaptor connects through an initial link to an initiator port on the switch and the device interface connects through a second link to a device port on the switch; and performing isolation testing on the switch, device port, initiator port, and the first and second links if the path includes the switch.

65. The article of manufacture of claim 59, wherein the device comprises a storage system, wherein the storage system comprises storage areas, wherein the diagnostic tool code is further capable of causing the processor to perform:

receiving input from the user indicating storage areas to test in the storage system, wherein isolation tests on the storage system are performed with respect to those storage areas indicated by the user.

66. An article of manufacture for implementing a diagnostic tool for automatically diagnosing a system, wherein the diagnostic tool is embedded in a computer readable medium and includes code capable of causing a processor to perform:

determining a path in the system to test, wherein the path includes path components including at least a host adaptor, a link, a device interface, and a device;

determining whether the path components include at least one switch, device port, initiator port, and links therebetween, wherein the host adaptor connects through an initial link to an initiator port on the switch and the device interface connects through a second link to a device port on the switch;

performing an initial test to determine if there is a failure in the path;

adding at least one of the path components to a suspect list capable of being a cause of the failure, wherein the suspect list is implemented in a computer readable data structure;

performing at least one isolation test on at least one of the path components added to the suspect list;

performing isolation testing on the switch, device port, initiator port, and the first and second links if the path includes the switch;

removing the tested path component from the suspect list if the isolation test confirms that the tested path component cannot be a source of the failure; and returning the suspect list to a user to provide information on the path components capable of being the cause of the failure.

67. The article of manufacture of claim 66, wherein isolation testing the host adaptor comprises:

generating output to instruct the user to disconnect the host adaptor from the link, wherein the isolation test is performed on the host adaptor after the user provides input indicating that the host adaptor was disconnected, and wherein the host adaptor is removed from the suspect list if the host adaptor passes a diagnostic test.

68. The article of manufacture of claim 66, wherein the device comprises a storage system, wherein the storage system comprises storage areas, wherein the diagnostic tool code is further capable of causing the processor to perform:

receiving input from the user indicating storage areas to test in the storage system, wherein isolation tests on the storage system are performed with respect to those storage areas indicated by the user.

* * * * *